(12) United States Patent
Tezuka et al.

(10) Patent No.: US 11,780,425 B2
(45) Date of Patent: Oct. 10, 2023

(54) VEHICLE CONTROL APPARATUS

(71) Applicant: TOYOTA JIDOSHA KABUSHIKI KAISHA, Toyota (JP)

(72) Inventors: Yuki Tezuka, Toyota (JP); Naoki Kusumoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 483 days.

(21) Appl. No.: 16/952,366

(22) Filed: Nov. 19, 2020

(65) Prior Publication Data

US 2021/0197796 A1     Jul. 1, 2021

(30) Foreign Application Priority Data

Dec. 25, 2019  (JP) .................................. 2019-233780

(51) Int. Cl.
| | | |
|---|---|---|
| *B60W 30/045* | (2012.01) | |
| *B60W 30/14*  | (2006.01) | |
| *B60W 30/18*  | (2012.01) | |

(52) U.S. Cl.
CPC ........ *B60W 30/045* (2013.01); *B60W 30/143* (2013.01); *B60W 30/18145* (2013.01); *B60W 2510/20* (2013.01); *B60W 2520/10* (2013.01); *B60W 2520/14* (2013.01);
(Continued)

(58) Field of Classification Search
CPC ............. B60W 30/045; B60W 30/143; B60W 30/18145; B60W 2510/20; B60W 2520/10; B60W 2520/14; B60W 2552/30; B60W 2552/53; B60W 2720/106; B60W 40/072; B60W 40/109
See application file for complete search history.

(56) References Cited

U.S. PATENT DOCUMENTS

| | | | |
|---|---|---|---|
| 2005/0270145 A1 | 12/2005 | Kataoka et al. | |
| 2011/0178689 A1* | 7/2011 | Yasui ................. | B60W 40/076 701/70 |

(Continued)

FOREIGN PATENT DOCUMENTS

| | | | | |
|---|---|---|---|---|
| EP | 2712780 A1 * | 4/2014 | .......... | B60T 8/17555 |
| JP | 2005205979 A | 8/2005 | | |
| JP | 2005343303 A | 12/2005 | | |

(Continued)

*Primary Examiner* — Nadeem Odeh
(74) *Attorney, Agent, or Firm* — Dickinson Wright, PLLC

(57) ABSTRACT

The vehicle control apparatus comprises a sensor to detect a turning movement physical quantity, an acceleration-deceleration device, a control unit, and a device to obtain road shape information representing a shape of a road at a position that is away from a vehicle by a predetermined distance. The unit determines that a first control start condition becomes satisfied when a magnitude of the physical quantity exceeds a first value while the curved road has not been determined to be present based on the road shape information, to perform an acceleration-deceleration control for making the vehicle run at a target speed depending on a curvature of the road. The unit determines that a second control start condition becomes satisfied when the magnitude of the physical quantity exceeds a second value smaller than the first value while the curved road has been determined to be present to perform the acceleration-deceleration control.

3 Claims, 12 Drawing Sheets

(52) U.S. Cl.
CPC ..... *B60W 2552/30* (2020.02); *B60W 2552/53* (2020.02); *B60W 2720/106* (2013.01)

(56) References Cited

U.S. PATENT DOCUMENTS

2015/0094927 A1   4/2015   Takahashi et al.
2019/0359120 A1   11/2019  Furugori

FOREIGN PATENT DOCUMENTS

| | | |
|---|---|---|
| JP | 2008195402 A | 8/2008 |
| JP | 2009190464 A | 8/2009 |
| JP | 2010006279 A | 1/2010 |
| JP | 2015067270 A | 4/2015 |
| JP | 2019202656 A | 11/2019 |

* cited by examiner

VEHICLE CONTROL APPARATUS

TECHNICAL FIELD

The present disclosure relates to a vehicle control apparatus configured to perform an acceleration-deceleration control for controlling an acceleration and a deceleration (i.e., an acceleration-deceleration) of the vehicle so as to allow the vehicle to travel/run at an appropriate speed on a curved road (or in a curved lane).

BACKGROUND

There has been a known vehicle control apparatus configured to perform an acceleration-deceleration control (sometimes referred to as a speed management control or an SPM control) for controlling an acceleration-deceleration of the vehicle when the vehicle travels on a curved road. For instance, a vehicle control apparatus (hereinafter, referred to as a "conventional apparatus") disclosed in Japanese Patent Application Laid-Open (kokai) No. 2015-67270 performs, as the SPM control, a G vector control and a preview G vector control. The G vector control is a control for controlling the acceleration-deceleration of the vehicle using a "lateral acceleration of (acting on) the vehicle" detected by a sensor. The preview G vector control is a control for controlling the acceleration-deceleration of the vehicle based on a vehicle speed Vpv, a current vehicle speed V, and a road curvature Kpv. The vehicle speed Vpv is a speed of the vehicle when the vehicle is at a preview position/point that is away from the current position of the vehicle by a distance Lpv in a forward direction. The road curvature Kpv is a road curvature at the preview position.

The road curvature Kpv (i.e. the road curvature at the preview position) starts to increase before the vehicle starts to change its traveling/running direction as the vehicle comes close to the curved road (i.e., before a driver starts to operate/turn a steering wheel).

In view of the above, the conventional apparatus performs the preview G vector control to control the acceleration-deceleration of the vehicle before the vehicle starts to change its traveling/running direction.

The conventional apparatus obtains the road curvature Kpv (i.e. the road curvature at the preview position) based on a map data. Therefore, it is necessary for the conventional apparatus to detect/infer a current position of the vehicle based on GPS signals or the like. When the current position cannot be detected with high accuracy, the road curvature Kpv greatly deviates from a true value. In addition, when the vehicle is in an area where the vehicle cannot receive the GPS signals, the road curvature Kpv cannot be obtained. Furthermore, if the map data does not have data that has been updated to include a new road curvature, the road curvature Kpv may also greatly deviate from the true value.

For the reasons mentioned above, the acceleration-deceleration controlled by the above described preview G vector control may deviate from an ideal acceleration-deceleration that is obtained/determined based on the (true) road curvature of the road on which the vehicle is actually traveling. This may cause the driver to feel uneasy. Therefore, it may be considered that the apparatus is configured to perform only the G vector control without performing the preview G vector control.

The G vector control starts when the lateral acceleration actually start to occur (or act on the vehicle VA). Therefore, for example, when the vehicle VA change lanes between the straight lanes, the G vector control may be started, despite the fact that the vehicle VA is not traveling/running on the curved road. In order to prevent the G vector control from being started in such a case, the apparatus may be configured to start the G vector control when the lateral acceleration becomes equal to or larger than a "lateral acceleration threshold that has been set at a relatively high value". However, if the lateral acceleration threshold has been set at the high value, a start timing of the G vector control is delayed, and thus, the driver may operate/depress an brake pedal when traveling on the curved road. The driver who has operated the brake pedal in the above case may doubt the reliability of the SPM control.

SUMMARY

The present disclosure has been made to cope with the problems described above. One of the objectives of the present disclosure is to provide a vehicle control apparatus that is capable of decreasing the possibility that the acceleration-deceleration control is incorrectly started when the vehicle is not travelling on the curved road, and of increasing the possibility that the acceleration-deceleration control is started at the early timing when the vehicle is travelling on the curved road.

A vehicle control apparatus (hereinafter, referred to as a "present disclosed apparatus") in some embodiments of the present disclosure, comprises:

a sensor (22) configured to detect a turning movement physical quantity that varies depending on a state of a turning movement of a vehicle when the vehicle is turning;

an acceleration-deceleration device (40, 46, 50, 54) configured to vary an acceleration-deceleration of the vehicle;

a control unit (20) configured to perform an acceleration-deceleration control to:

determine whether or not the vehicle is traveling on a curved road by determining whether or not the turning movement physical quantity satisfies a predetermined control start condition (step 600 to step 695);

calculate, when it is determined that the vehicle is traveling on a curved road (step 540: Yes), a required acceleration-deceleration to let the vehicle run at a target speed depending on a curvature of the curved road, and control the acceleration-deceleration device so as to make an actual acceleration-deceleration of the vehicle become equal to the calculated required acceleration-deceleration (step 555); and a shape obtaining device (23, 27, 28, 29) configured to obtain road shape information representing a shape of a road at a position that is away from the vehicle by a predetermined distance along a moving direction of the vehicle.

The control unit is configured to:

determine whether or not a curved road is present in the moving direction of the vehicle based on the road shape information (step 615);

determine that a first control start condition as the control start condition becomes satisfied (step 625) when a magnitude of the turning movement physical quantity has changed from a value smaller than a first value to a value equal to or larger than the first value (step 630: Yes), in a case where it has been determined that the curved road is not present (step 615: No); and determine that a second control start condition as the control start condition becomes satisfied (step 625)

when the magnitude of the turning movement physical quantity has changed from a value smaller than a second value smaller than the first value to a value equal to or larger than the second value (step 620: Yes), in a case where it has been determined that the curved road is present (step 615: Yes).

In this manner, the thus configured present disclosed apparatus changes the control start condition to a condition to be more easily satisfied (by the turning movement physical quantity such as the yaw rate or a lateral acceleration) when it is determined that the curved road is present based on the road shape information at the position (or the preview position) that is away from the vehicle by the predetermined distance along the moving direction of the vehicle as compared to (or than) when it is not determined that the curved road is present. Accordingly, the present disclosed apparatus can decrease the possibility that the acceleration-deceleration control is incorrectly started when the vehicle is travelling on a straight road, and can increase the possibility that the acceleration-deceleration control is started at the earlier timing when the vehicle is travelling on the curved road.

In some embodiments of the present disclosure, the control unit is configured to:
start a first acceleration-deceleration control as the acceleration-deceleration control (step 550 shown in FIG. 10), when it is determined that the first control start condition becomes satisfied (step 1025: Yes);
start a second acceleration-deceleration control as the acceleration-deceleration control (step 1020), when it is determined that the second control start condition becomes satisfied (step 1015: Yes); and
calculate the required acceleration-deceleration in such a manner that a magnitude of the required acceleration-deceleration for the second acceleration-deceleration control is smaller than a magnitude of the required acceleration-deceleration for the first acceleration-deceleration control (FIG. 11).

The second control start condition, that is more easily satisfied than the first control start condition, becomes satisfied earlier, so that the second acceleration-deceleration control firstly starts to be executed. Therefore, even if the acceleration-deceleration control is incorrectly started when the vehicle is not travelling on the curved road, the second acceleration-deceleration control is executed. In addition, the magnitude of the required acceleration-deceleration for the second acceleration-deceleration control for a certain vehicle speed and a certain curvature is smaller than the magnitude of the required acceleration-deceleration for the first acceleration-deceleration control for that certain vehicle speed and that certain curvature. Consequently, even if the acceleration-deceleration control (that is the second acceleration-deceleration control) is incorrectly started to be executed, strange feeling that the driver may have can be suppressed/decreased.

In some embodiments of the present disclosure, the control unit is configured to calculate, when it is determined that the first control start condition becomes satisfied while executing the second acceleration-deceleration control so as to start the first acceleration-deceleration control, the required acceleration-deceleration in such a manner that a magnitude of a change amount in the required acceleration-deceleration per unit time does not exceed a predetermined guard threshold (step 1420 to step 1435) in a period from a start time point at which the first acceleration-deceleration control is started to an end time point at which a predetermined time elapses from the start time point (step 1405: Yes).

According to the above configuration, when and after the first acceleration-deceleration control is started while the second acceleration-deceleration control is being executed, the change amount in the required acceleration-deceleration per unit time does not exceed the guard threshold. Therefore, strange feeling or uneasiness that the driver may have can be suppressed/decreased.

Some embodiments of the present disclosure comprise a steered angle changing device (60, 66) configured to change a steered angle of the vehicle, and the control unit is configured to:
perform a steering angle control to calculate a target steered angle for letting the vehicle travel along a lane, and to control the steered angle changing device so as to make an actual steered angle of the vehicle equal to the target steered angle;
determine whether or not a magnitude of the target steered angle is equal to or larger than a predetermined threshold angle (step 905), when it is determined that the curved road is present based on the road shape information;
start the acceleration-deceleration control when the second control start condition becomes satisfied (step 620 shown in FIG. 9: Yes) while the magnitude of the target steered angle is equal to or larger than the threshold angle (step 905: Yes); and
determine that a third control start condition as the control start condition becomes satisfied (step 910: Yes), when a magnitude of the turning movement physical quantity has changed from a value smaller than a third value to a value equal to or larger than the third value while the magnitude of the target steered angle is smaller than the threshold angle (step 905: No), the third value being smaller than the first value and larger than the second value.

According to the above configuration, the possibility that the acceleration-deceleration control is incorrectly started when the vehicle is travelling on the straight road can be decreased. In addition, the possibility that the acceleration-deceleration control is started at the earlier timing when the vehicle is travelling on the curved road can be increased.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

DETAILED DESCRIPTION

First Embodiment

Figure 1:
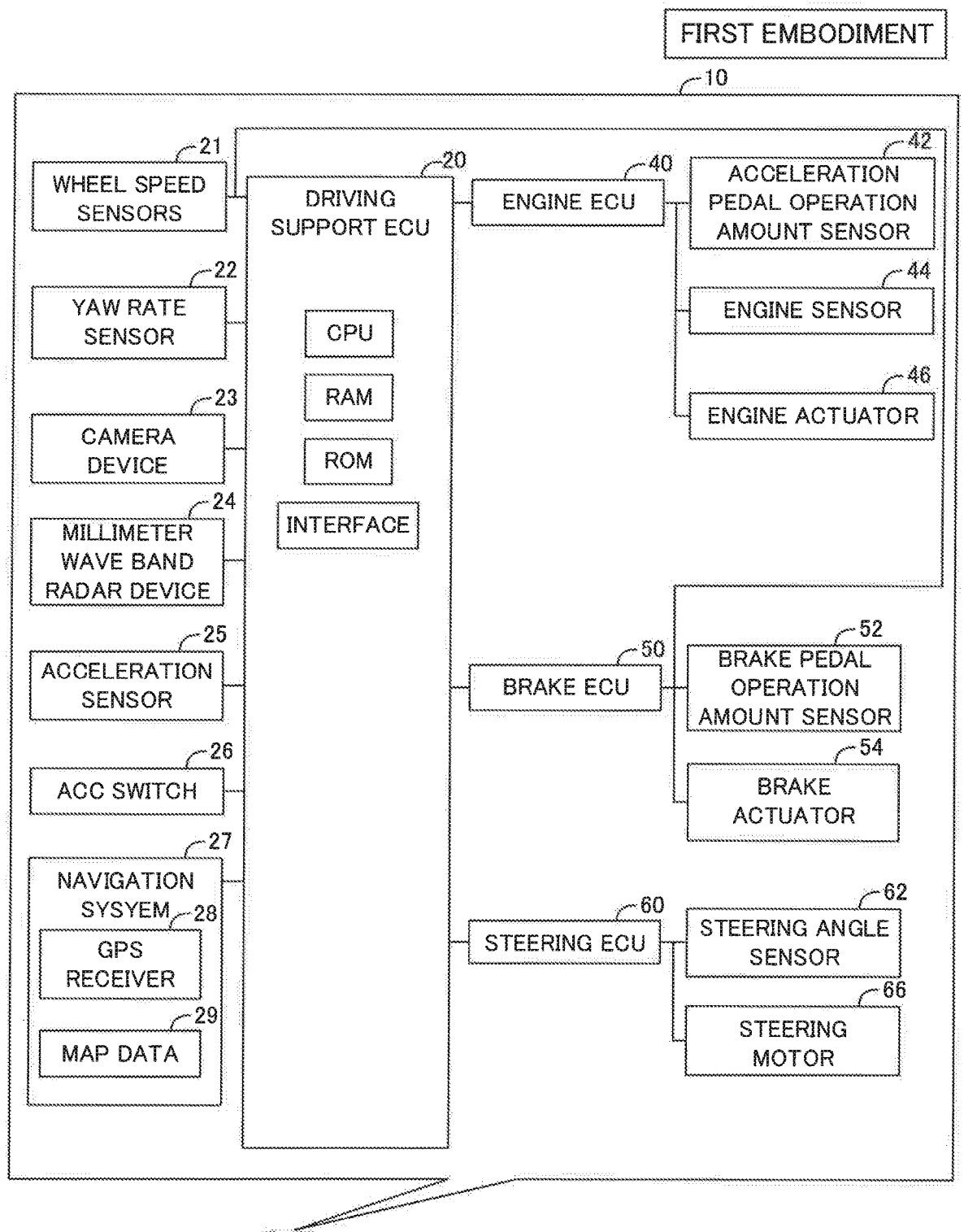
FIG. 1 is a schematic diagram of a vehicle control apparatus (a first control apparatus) according to a first embodiment of the present disclosure.

A vehicle control apparatus (hereinafter, referred to as a "first apparatus") 10 according to a first embodiment of the present disclosure will be described with reference to FIGS. 1 to 8. FIG. 1 illustrates the first apparatus 10 and a vehicle VA to which the first apparatus 10 is applied.

As shown in FIG. 1, the first apparatus 10 comprises a driving support ECU (hereinafter, referred to as a "DSECU") 20, an engine ECU 40, a brake ECU 50, and a steering ECU 60. These ECUs are communicably connected with each other so as to mutually exchange data through a CAN (Controller Area Network).

ECU stands for electronic control unit. Each of the ECUs is an electronic control unit that includes a microcomputer as a main component. The microcomputer includes a CPU, a ROM, a RAM, and an interface. The CPU is configured or programmed to realize various functions by executing instructions, programs, or routines stored in a memory that is the ROM. Some or all of the ECUs 20, 40, 50, and 60 may be integrated into a single ECU.

The first apparatus 10 further comprises a plurality of wheel speed sensors 21, a yaw rate sensor 22, a camera device 23, a millimeter wave radar device 24, an acceleration sensor 25, an ACC (Adaptive Cruise Control) switch 26, and a navigation system 27. They are connected to the DSECU 20.

The wheel speed sensors 21 are provided to respective wheels of the vehicle VA. Each of the wheel speed sensors 21 generates one wheel pulse signal when the corresponding one wheel rotates by a predetermined angle. The DSECU 20 counts the number of the wheel pulse signal from each of the wheel speed sensors 21 per unit time, and obtains a wheel rotational speed (or a wheel speed) of each of the wheels based on the counted number. The DSECU 20 obtains a vehicle speed Vs indicative of a moving speed of the vehicle VA based on the wheel speeds of the wheels. For instance, the DSECU 20 obtains an average of the wheel speeds of four of the wheels as the vehicle speed Vs.

The yaw rate sensor 22 detects a magnitude of a yaw rate acting on the vehicle VA so as to output/generate a signal indicative of a yaw rate Yr based on the detected magnitude of the yaw rate.

The camera device 23 is arranged at an upper part of a front windshield and inside a cabin of the vehicle VA. The camera device 23 is configured to obtain image data of an image (camera image) that is an image of a scene/area in front of (or ahead of) the vehicle VA. The camera device 23 is configured to obtain, based on the image data, object information including a distance between an object and the vehicle VA and a direction of the object with respect to the vehicle VA as well as "information regarding a while line (lane marker) that defines a traveling lane in which the vehicle VA is traveling/running.

The millimeter wave radar device 24 is arranged at a front end of the vehicle and in the vicinity of a center of the vehicle in a vehicle width direction. The millimeter wave radar device 24 radiates a millimeter wave that propagates in a predetermined area in front of (ahead of) the vehicle. The millimeter wave is reflected by an object such as an other vehicle, a pedestrian, a motorcycle, and a bicycle. The millimeter wave radar device 24 receives the reflected wave, and obtains object information based on the received reflected wave. The object information obtained by the millimeter wave radar device 24 includes a distance between the object and the vehicle VA, a relative speed of the object with respect to the vehicle VA, and the direction of the object with respect to the vehicle VA.

It should be noted that the DSECU 20 corrects the object information obtained by the millimeter wave radar device 24 based on the object information obtained by the camera device 23 so as to obtain final object information that is used for an ACC (adaptive cruise control) described later.

The acceleration sensor 25 is configured to detect a front-rear direction acceleration Gx and a lateral acceleration Gy, and transmits to the DSECU 20 signals indicative of those accelerations. The front-rear direction acceleration Gx is an acceleration of the vehicle VA in a longitudinal direction (front-rear direction) of the vehicle VA. The lateral acceleration Gy is an acceleration of the vehicle VA in a lateral direction (vehicle width direction) of the vehicle VA.

The ACC switch 26 is a switch operated by the driver to switch execution states of the ACC between an execution allowable state and an execution unallowable/prohibited state. The execution allowable state means a state where the ACC can be executed, and the execution unallowable state means a state where the ACC cannot be executed (or is prohibited). When the driver operates the ACC switch 26 while the execution state of the ACC is in the execution unallowable state, the DSECU 20 changes the execution state to the execution allowable state. In contrast, when the driver operates the ACC switch 26 while the execution state of the ACC is in the execution allowable state, the DSECU 20 changes the execution state to the execution unallowable state.

In addition, the ACC switch 26 is operated by the driver to set/change set parameters used for the ACC that include a target set vehicle speed Vset described later and a target inter-vehicle distance Dtgt described later.

The navigation system 27 includes a GPS receiver 28. The GPS receiver 28 receives GPS signals from a plurality of GPS satellites, and specify/obtains a current position (on earth's surface) of the vehicle VA based on the received GPS signals. The GPS receiver 28 transmits position signal/data indicative of the specified current position of the vehicle VA to the DSECU 20. The navigation system 27 has map data 29 (has stored the map data 29 in advance) that includes information on "a position on the earth's surface, a road curvature, and the like" of each of curved roads.

The engine ECU 40 is connected with an acceleration pedal operation amount sensor 42 and an engine sensor 44, and receives detection signals from these sensors 42, 44.

The acceleration pedal operation amount sensor 42 is configured to detect an operation amount (i.e., an acceleration pedal operation amount AP) of an unillustrated acceleration pedal of the vehicle VA. When the driver does not operate (release) the acceleration pedal, the acceleration pedal operation amount AP is "0".

The engine sensor 44 is for detecting operating state amounts of an unillustrated a "gasoline fuel injection, spark ignition, internal combustion engine" serving as a driving source of the vehicle VA. The engine sensor 44 may include a throttle valve opening sensor, an engine rotational speed sensor, and an intake air amount sensor.

The engine ECU 40 is further connected with an engine actuator 46 that may be a throttle valve actuator and fuel injectors. The engine ECU 40 is configured to drive the engine actuator 46 to change a torque generated by the internal combustion engine so as to adjust a driving force of the vehicle VA.

The engine ECU 40 determines a target throttle valve opening TAtgt in such a manner that the target throttle valve opening TAtgt becomes greater as the acceleration pedal operation amount AP becomes greater. The engine ECU 40 drives the throttle valve actuator so as to make a throttle valve opening equal to the target throttle valve opening TAtgt.

The brake ECU 50 is connected with the wheel speed sensors 21 and a brake pedal operation amount sensor 52, and receives detected signals from them.

The brake pedal operation amount sensor 52 is configured to detect an operation amount (i.e., a brake pedal operation amount BP) of an unillustrated brake pedal of the vehicle VA. When the driver does not operate (release) the brake pedal, the brake pedal operation amount BP is "0".

The brake ECU 50 is configured to obtain each of the wheel speeds and the vehicle speed Vs base on the wheel pulse signals from each of the wheel speed sensors 21, similarly to the DSECU 20. The brake ECU 50 may be configured to receive the wheel speeds and the vehicle speed Vs from the DSECU 20.

The brake ECU 50 is further connected to a brake actuator 54 that is a hydraulic control actuator. The brake actuator 54 is dispose in an unillustrated hydraulic circuit between a master cylinder for pressurizing a hydraulic oil in accordance with a brake pedal force and friction brake devices including well-known wheel cylinders provided at the wheels. The brake actuator 54 can adjust/change a pressure of the hydraulic oil supplied to the wheel cylinders so as to adjust/control a brake force of the vehicle VA.

The brake ECU 50 determines a target acceleration-deceleration that is now negative, based on the brake pedal operation amount BP. The brake ECU 50 drives the brake actuator 54 so as to make an actual acceleration of the vehicle VA equal to the target acceleration-deceleration.

The steering ECU 60 is a control unit for a well-know electric power steering system, and is connected with a steering angle sensor 62 and a steering motor 66. The steering motor 66 is embedded in an "unillustrated steering mechanism including a steering wheel, a steering shaft connected to the steering wheel, and a steering gear mechanism" of the vehicle VA.

The steering angle sensor 62 is configured to detect a steering angle θ of the vehicle VA so as to transmit the detected signal indicative of the steering angle θ to the steering ECU 60.

The steering motor 66 generates torque using electric power controlled by the steering ECU 60. The direction, magnitude, and the like, of the torque are adjusted by the steering ECU 60. The torque is used to generate a steering assist torque and/or to steer a left steered wheel and a right steered wheel. Thus, the steering ECU 60 is configured to control/change the steering/steered angle θ using the steering motor 66. The electric power is supplied from an unillustrated vehicle battery mounted on the vehicle VA to the steering motor 66.

<ACC>

The DSECU 20 is configured to perform/execute the ACC as described below, when the execution state of the ACC is the execution allowable state.

Namely, when a preceding vehicle that is an other vehicle in front of the vehicle VA is not present, the DSECU 20 calculates/determines a required acceleration-deceleration Gxacc of the ACC for having the vehicle VA travel/run at the above mentioned target set vehicle speed Vset, and performs a constant speed control based on the required acceleration-deceleration Gxacc.

In contrast, when the preceding vehicle is present, the DSECU 20 calculates/determines a required acceleration-deceleration Gxacc of the ACC for having the vehicle VA travel/run in such a manner that an inter-vehicle distance between the preceding vehicle and the vehicle VA becomes equal to the above mentioned target inter-vehicle distance Dtgt, and performs a trailing travel control based on the required acceleration-deceleration Gxacc.

It should be noted that the DSECU 20 is configured to determine whether or not the preceding vehicle is present, based on the object information obtained by the millimeter wave radar device 24 and/or the object information obtained by the camera device 23.

While the DSECU 20 is performing the ACC, the DSECU 20 transmits, to the engine ECU 40 and the brake ECU 50, the required acceleration-deceleration Gxacc of the ACC for either the constant speed control or the trailing travel control, as a target acceleration-deceleration Gtgt. This can make the actual acceleration of the vehicle VA equal to the target acceleration-deceleration Gtgt without requiring the acceleration pedal operation and the brake pedal operation by the driver. It should be noted that the acceleration-deceleration indicates either an acceleration or a deceleration depending on a sign (+ or −) of the acceleration-deceleration. Namely, in the present specification, when the sign of the acceleration-deceleration is positive (plus), the acceleration-deceleration means an acceleration. When the sign of the acceleration-deceleration is negative (minus), the acceleration-deceleration means a deceleration. Furthermore, in the present specification, when the acceleration is great, an absolute value of the acceleration (or an absolute value of the acceleration-deceleration that is positive) is great. When the acceleration is small, the absolute value of the acceleration (or the absolute value of the acceleration-deceleration that is positive) is small. When the deceleration is great, an absolute value of the deceleration (or an absolute value of the acceleration-deceleration that is negative) is great. When the deceleration is small, the absolute value of the deceleration (or the absolute value of the acceleration-deceleration that is negative) is small.

<SPM Control>

The brake ECU 20 is configured to perform a speed management control (hereinafter, sometimes referred to as an "SPM control" or an "acceleration-deceleration control") when an SPM start condition becomes satisfied as the vehicle VA enters a curved road while the ACC is being executed. The SPM control is a control for controlling the acceleration-deceleration of the vehicle VA so that the vehicle VA travels/runs in a curved road at an appropriate vehicle speed for the curved road.

The DSECU 20 calculates (determines through calculation) the required acceleration-deceleration Gxacc for the ACC as well as a required acceleration-deceleration Gxspm for the SPM control concurrently, and selects, as a target acceleration-deceleration Gxtgt, the required acceleration-deceleration Gxacc or the required acceleration-deceleration Gxspm, whichever is smaller. Thereafter, the DSECU 20 controls the actual acceleration-deceleration of the vehicle VA using the target acceleration-deceleration Gxtgt (in such a manner that the actual acceleration-deceleration of the vehicle VA coincides with the target acceleration-deceleration Gxtgt).

It should be noted that, when the SPM control needs not be executed, the DSECU 20 sets the required acceleration-deceleration Gxspm for the SPM control to a value close to a positive infinite value so that the required acceleration-deceleration Gxspm for the SPM is not selected as the target acceleration-deceleration Gxtgt (in other words, the actual acceleration-deceleration of the vehicle VA is controlled based on the required acceleration-deceleration Gxacc for the ACC). The value close to a positive infinite value as described above may be referred to as an "invalid acceleration-deceleration Gxinv".

Figure 2:
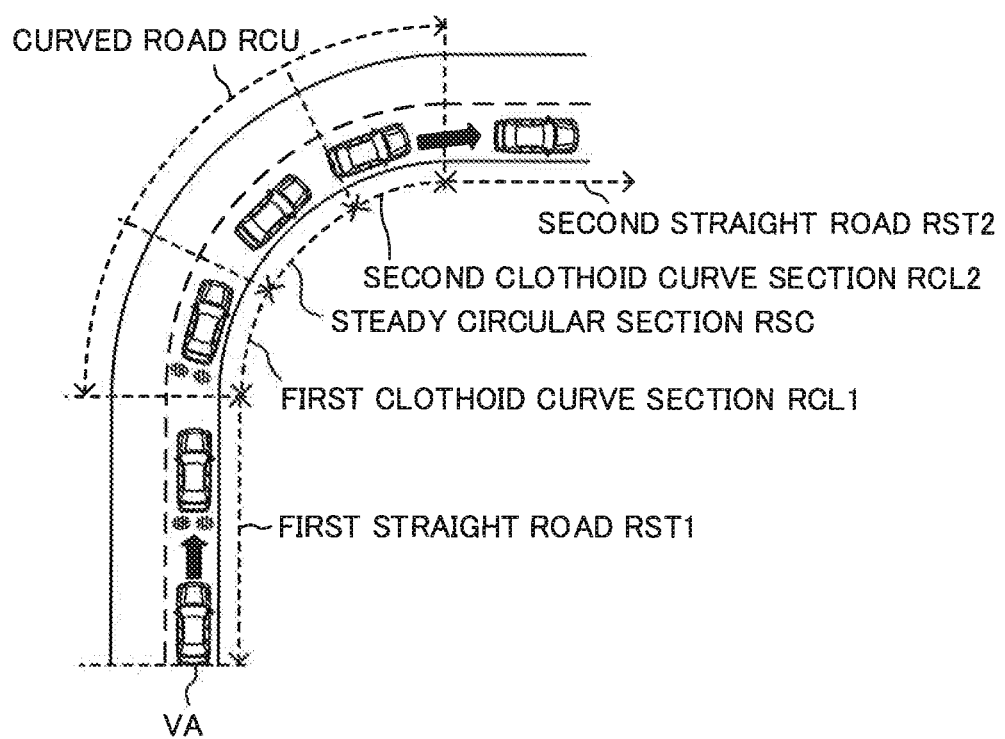
FIG. 2 is a plan view of a section including a curved road.
Figure 3:
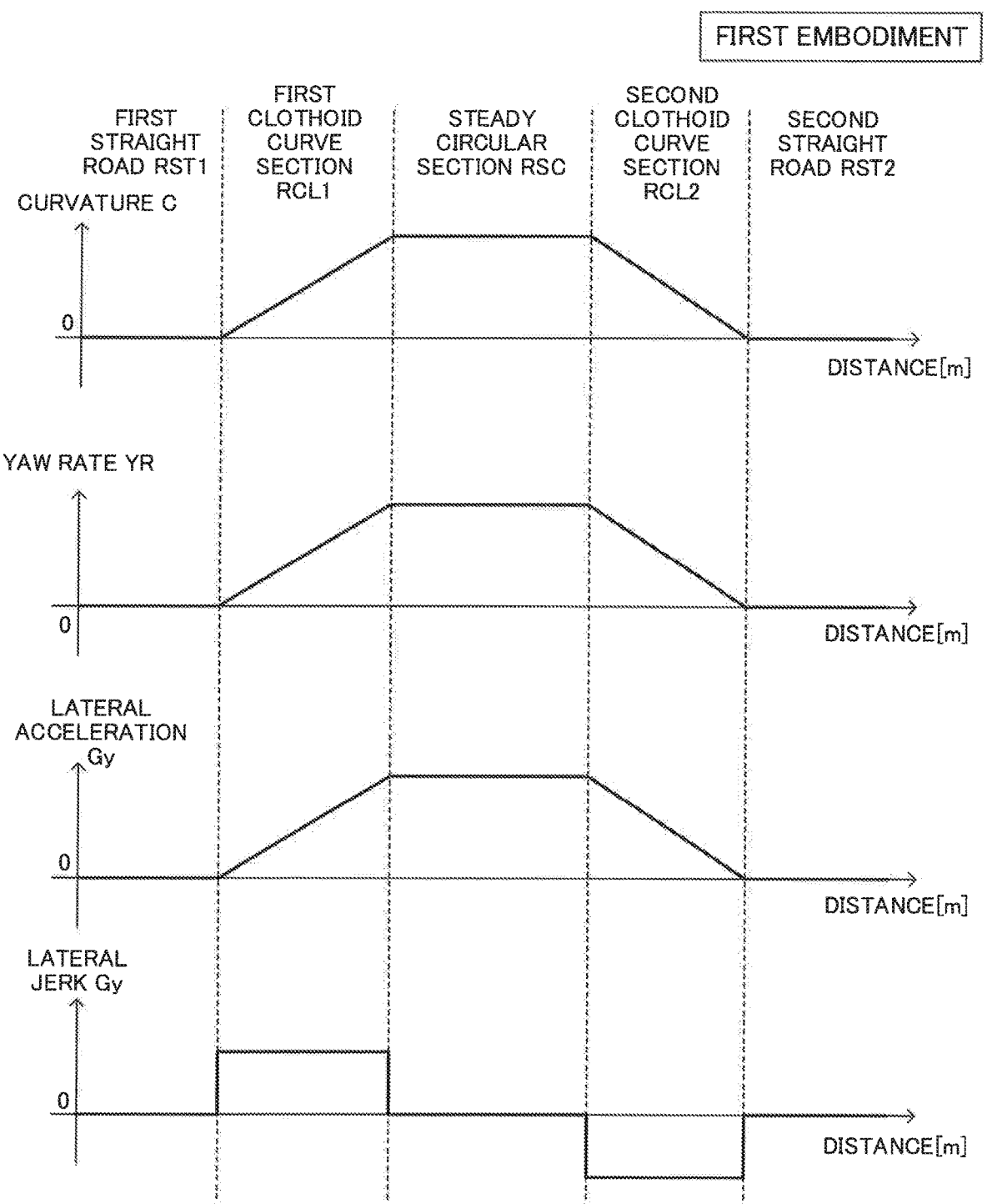
FIG. 3 is a drawing for describing a curvature of the curved road, a yaw rate, a lateral acceleration and a lateral jerk, observed while a vehicle is traveling on the curved road.

FIG. 3 shows "the yaw rate Yr, the lateral acceleration Gy, and a lateral jerk Jy that is a derivative value (dGy/dt) of the lateral acceleration Gy with respect to time" acting on the vehicle VA, when the vehicle VA travels/runs, at a constant speed, on "a first straight road RST1, a curved road RCU, and then a second straight road RST2" shown in FIG. 2 in this order. It should be noted that the curved road RCU consists of a first clothoid curve section RCL1, a steady circular section RSC, and a second clothoid curve section RCL2, as shown in FIG. 2.

As shown in FIG. 3, a curvature C (a reciprocal of a curvature radius) gradually increases from zero in the first clothoid curve section RCL1, becomes a constant in the steady circular section RSC, and then gradually decreases to zero in the second clothoid curve section RCL2. The curvature C represents sharpness/tightness of the curved road RCU. As the curvature C is smaller, the curved road RCU curves more gently. As the curvature C is larger, the curved road RCU curves more sharply.

As the vehicle VA enters the first clothoid curve section RCL1 from the first straight road RST1, the driver of the vehicle VA starts to operate the steering wheel (i.e., starts turning the steering wheel). As a result, the yaw rate Yr and the lateral acceleration Gy increase gradually. The lateral jerk Jy instantly rises (increases) up to a certain positive constant value at the time point at which the lateral acceleration Gy starts to increase, and then, remains at the positive constant value. When and after the vehicle VA enters the steady circular section RSC from the first clothoid curve section RCL1, the lateral acceleration Gy remains at a constant value. The lateral jerk Jy becomes equal to zero at the time point at which the vehicle VA enters the steady circular section RSC from the first clothoid curve section RCL1, and remains at zero while the vehicle travels/runs within the steady circular section RSC. When and after the vehicle VA enters the second clothoid curve section RCL2 from the steady circular section RSC, the lateral acceleration Gy decreases gradually. The lateral jerk Jy instantly changes to a certain negative constant value at the time point at which the lateral acceleration Gy starts to decrease, and then, remains at the negative constant value.

As the vehicle VA enters the first clothoid curve section RCL1, and thus, the yaw rate Yr increases, the SPM start condition (control start condition) described later becomes satisfied. When the SPM start condition becomes satisfied, the DSECU 20 starts to calculate the required acceleration-deceleration Gxspm for the SPM control.

More specifically, while the vehicle VA travels within the first clothoid curve section RCL1, the DSECU 20 calculates the required acceleration-deceleration Gxspm that makes the vehicle VA decelerate (i.e., Gxspm<0). While the vehicle VA travels within the steady circular section RSC, the DSECU 20 calculates the required acceleration-deceleration Gxspm that makes the vehicle VA travel/run at a constant speed. While the vehicle VA travels within the second clothoid curve section RCL2, the DSECU 20 calculates the required acceleration-deceleration Gxspm that makes the vehicle VA accelerate (i.e., Gxspm>0).

(Outline of Operation)

An outline of the operation of the first apparatus 10 will next be described with reference to FIG. 4.

The DSECU 20 infers (calculates, extrapolates), as an inferred curvature Cp, a curvature C (i.e. a magnitude of the curvature C) of an own lane at a preview position Pp that is away from the current position of the vehicle VA by a distance Ld in a forward direction (i.e., moving/traveling direction of the vehicle VA). The own lane is a lane in which the vehicle VA is currently traveling. The DSECU 20 determines whether or not the inferred curvature Cp is equal to or larger than a predetermined curvature threshold Cpth When it is determined that the inferred curvature Cp is smaller than the curvature threshold Cpth, the DSECU 20 determines that the SPM start condition is satisfied if the yaw rate Yr becomes/is equal to or larger than a first yaw rate threshold Yr1th. It should be noted that the inferred curvature Cp obtained at a position P2 shown in FIG. 4 is equal to or larger than the curvature threshold Cpth, it is here assumed that the inferred curvature Cp is smaller than the curvature threshold Cpth for descriptive purposes.

Figure 4:
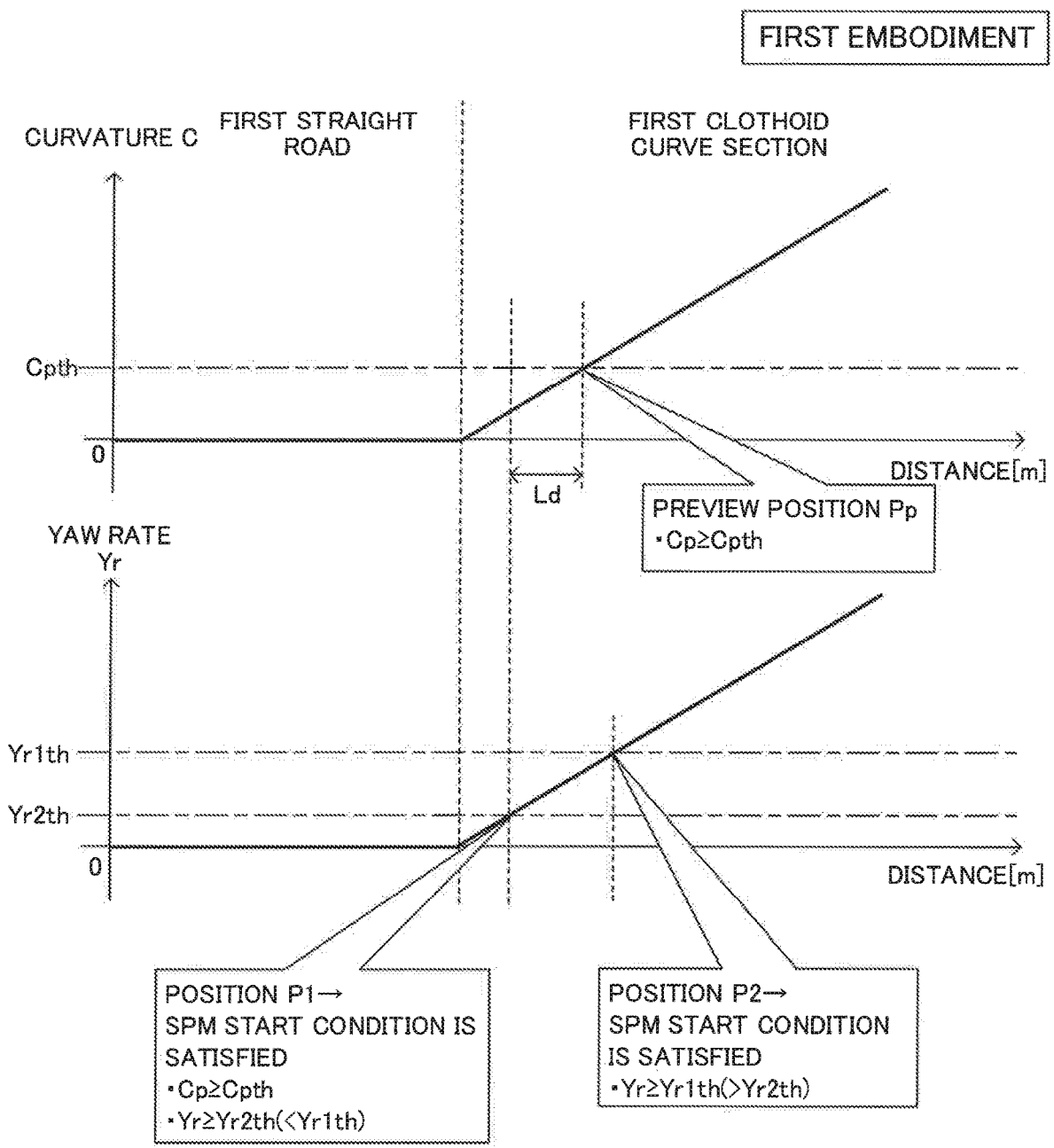
FIG. 4 is a drawing for describing a start condition of a speed management control (SPM control).

In contrast, when it is determined that the inferred curvature Cp is equal to or larger than the curvature threshold Cpth, the DSECU 20 determines that the SPM start condition is satisfied if the yaw rate Yr becomes/is equal to or larger than a second yaw rate threshold Yr2th (refer to a point P1 shown in FIG. 4). The second yaw rate threshold Yr2th has been set at a value that is smaller than the first yaw rate threshold Yr1th. In some cases, the first yaw rate threshold Yr1th is referred to as a "first value", and the second yaw rate threshold Yr2th is referred to as a "second value".

That is, when the inferred curvature Cp becomes equal to or larger than the curvature threshold Cpth, it is likely that the curved road RCU is present ahead of the vehicle VA. In view of this, the SPM start condition has been set at a condition that is more easily satisfied (by the yaw rate Yr in the case where the inferred curvature Cp is equal to or larger than the curvature threshold Cpth) as compared the case where the inferred curvature Cp is smaller than the curvature threshold Cpth. It should be noted that the SPM start condition for the case where the inferred curvature Cp is smaller than the curvature threshold Cpth (that is the condition that the yaw rate Yr is equal to or larger than the first yaw rate threshold Yr1th) may be referred to as a "normal start condition" or a "first control start condition". Furthermore, the SPM start condition for the case where the inferred curvature Cp is equal to or larger than the curvature threshold Cpth (that is the condition that the yaw rate Yr is equal to or larger than the second yaw rate threshold Yr2th) may be referred to as a "curved road presence case start condition" or a "second control start condition".

The thus configured first apparatus 10 can decrease the possibility that the SPM control is incorrectly started when the vehicle VA is not travelling on the curved road, and can increase the possibility that the SPM control is started at an appropriately early timing when the vehicle VA is travelling on the curved road.

(Specific Operation)

Figure 5:
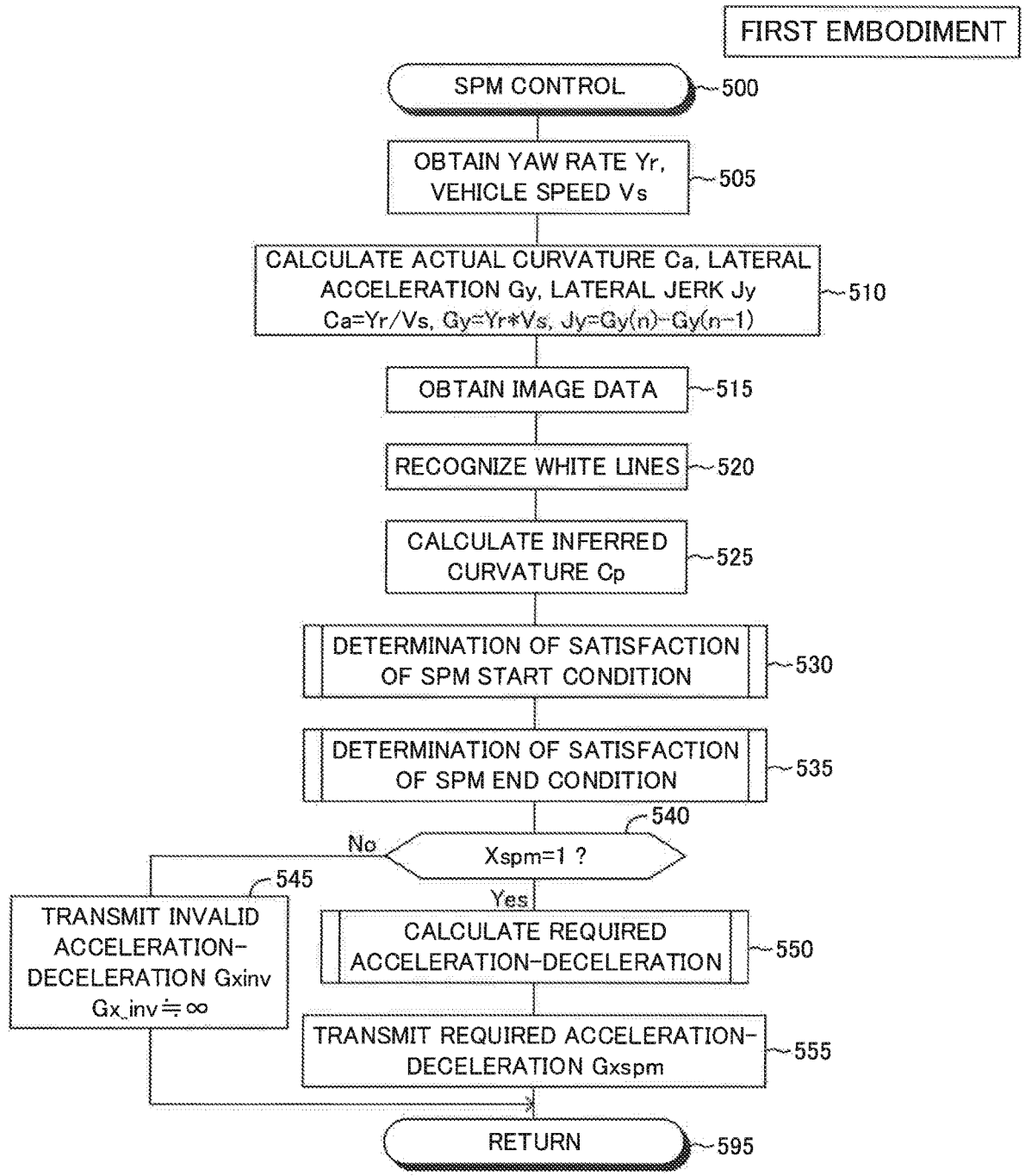
FIG. 5 is a flowchart executed by a CPU of a driving support ECU shown in FIG. 1.

The CPU of the DSECU 20 is configured or programmed to execute a routine (SPM control routine) shown in FIG. 5 every time a predetermined time elapses. Hereinafter, the CPU means the CPU of the DSECU 20, unless otherwise specified.

When an appropriate time point comes, the CPU starts processing from step 500, and executes the processes of step 505 to step 535 in this order, and proceeds to step 540.

Step 505: the CPU obtains/acquires the yaw rate Yr through receiving the signal from the yaw rate sensor 22, and obtains the vehicle speed Vs based on the wheel pulse signals from the wheel speed sensors 21.

Step 510: the CPU obtains (calculates) an actual curvature Ca that is a curvature C (of the road) at the current/present position of the vehicle VA, the lateral acceleration Gy, and the lateral jerk Jy.

More specifically, the CPU obtains the actual curvature Ca by applying the lateral acceleration Gy and the vehicle speed Vs to an equation (1) described below.

$$Ca=Yr/Vs \quad (1)$$

The CPU obtains the actual lateral acceleration Gy by applying the yaw rate Yr and the vehicle speed Vs to an equation (2) described below.

$$Gy=Yr \cdot Vs \quad (2)$$

The CPU obtains the lateral jerk Jy by applying a currently calculated Gy(n) and a previously calculated Gy(n−1) to an equation (3) described below. The previously calculated Gy(n−1) is a calculated Gy that was calculated a predetermined time before (or one calculation cycle before the present time point).

$$Jy=Gy(n)-Gy(n-1) \quad (3)$$

Step 515: the CPU obtains the camera image (i.e., image data) obtained by the camera device 23.

Step 520: the CPU specifies/recognizes a pair of lane markers (e.g., a left white line and a right white line) that define the lane (host lane) in which the vehicle VA is currently/presently traveling from (base on) the obtained image data.

Step 525: the CPU obtains, as the inferred curvature Cp, a curvature C of an imaginary line at the preview position Pp, the imaginary line passing through a center of the pair of the lane markers defining the host lane in the road width direction.

Step 530: the CPU executes a determination routine of a satisfaction of SPM start condition, described later in detail. The determination routine of a satisfaction of SPM start condition is a routine to determine whether or not the SPM start condition becomes satisfied.

Step 535: the CPU executes a determination routine of a satisfaction of SPM end condition, described later in detail. The determination routine of a satisfaction of SPM end condition is a routine to determine whether or not the SPM end condition becomes satisfied.

Step 540: the CPU determines whether or not a value of an SPM control flag Xspm is "1". The value of the SPM control flag Xspm is set to "1" when the SPM start condition becomes satisfied (refer to step 625 described later), and is set to "0" when the SPM end condition becomes satisfied (refer to step 715 described later). It should be noted that the value of the SPM control flag Xspm is set to "0" through an unillustrated initialization routine executed by the CPU when a position of an unillustrated ignition key switch is changed from an off position to an on position.

When the value of the SPM control flag Xspm is "0", the CPU makes a "No" determination at step 540 so as to proceed to step 545. At step 545, the CPU sets the required acceleration-deceleration Gxspm to the invalid acceleration-deceleration Gxinv, and transmits that required acceleration-deceleration Gxspm to the engine ECU 40 and the brake ECU 50. Thereafter, the CPU proceeds to step 595 so as to terminate the present routine tentatively.

In contrast, when the value of the SPM control flag Xspm is "1" at the time point at which the CPU proceeds to step 540, the CPU makes a "Yes" determination at step 540, and executes the processes of step 550 and step 555 in this order. Thereafter, the CPU proceeds to step 595 so as to terminate the present routine tentatively.

Step 550: the CPU executes a required acceleration-deceleration calculation routine described later to calculate the required acceleration-deceleration Gxspm.

Step 555: the CPU transmits that required acceleration-deceleration Gxspm to the engine ECU 40 and the brake ECU 50.

<SPM Start Condition Satisfaction Determination>

Figure 6:
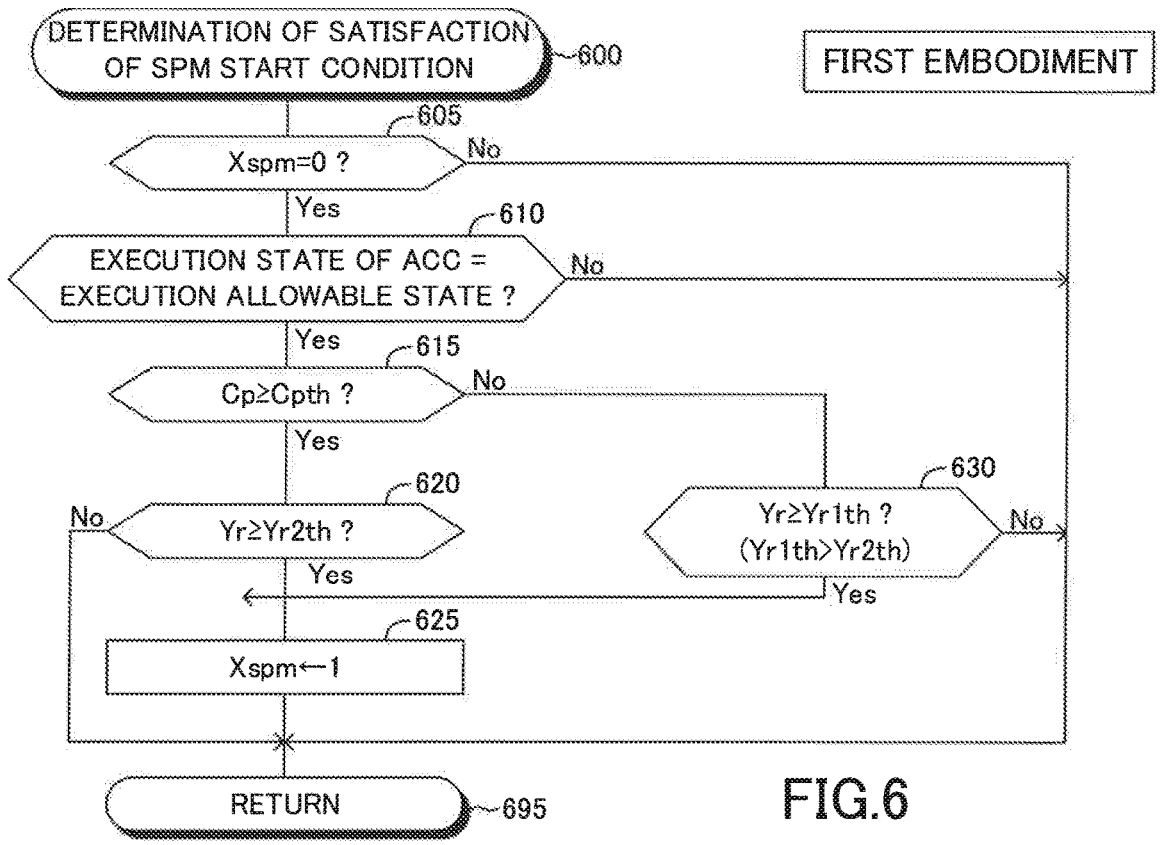
FIG. 6 is a flowchart illustrating a sub routine executed by the CPU for an SPM start condition satisfaction determination in the routine shown in FIG. 5.

When the CPU proceeds to step 530 shown in FIG. 5, the CPU starts processing from step 600 of the determination routine of a satisfaction of SPM start condition shown by a flowchart in FIG. 6, and proceeds to step 605. At step 605, the CPU determines whether or not the value of the SPM control flag Xspm is "0".

When the value of the SPM control flag Xspm is "0", the CPU makes a "Yes" determination at step 605, and proceeds to step 610. At step 610, the CPU determines whether or not the execution state of the ACC is the execution allowable state. When the execution state of the ACC is the execution allowable state, the CPU makes a "Yes" determination at step 610, and proceeds to step 615.

At step 615, the CPU determines whether or not the inferred curvature Cp is equal to or larger than the curvature threshold Cpth. When the inferred curvature Cp is equal to or larger than the curvature threshold Cpth, the CPU makes a "Yes" determination at step 615, and proceeds to step 620. At step 620, the CPU determines whether or not the yaw rate Yr is equal to or larger than the second yaw rate threshold Yr2th.

When the yaw rate Yr is smaller than the second yaw rate threshold Yr2th, the CPU makes a "No" determination at step 620, and proceeds to step 695 so as to terminate the present routine tentatively. In contrast, when the yaw rate Yr is equal to or larger than the second yaw rate threshold Yr2th, the CPU makes a "Yes" determination at step 620, and proceeds to step 625 so as to set the value of the SPM control flag Xspm to "1". Thereafter, the CPU proceeds to step 695 so as to terminate the present routine tentatively. In this manner, when the yaw rate Yr has changed from a value smaller than the second yaw rate threshold Yr2th to a value equal to or larger than the second yaw rate threshold Yr2th in the case where the inferred curvature Cp is equal to or larger than the curvature threshold Cpth, the CPU determines that the control start condition (second control start condition) becomes satisfied so as to set the SPM control flag Xspm to "1".

Meanwhile, when the inferred curvature Cp is smaller than the curvature threshold Cpth at the time point at which the CPU proceeds to step 615, the CPU makes a "No" determination at step 615, and proceeds to step 630. At step 630, the CPU determines whether or not the yaw rate Yr is equal to or larger than "the first yaw rate threshold Yr1th that is larger than the second yaw rate threshold Yr2th".

When the yaw rate Yr is smaller than the first yaw rate threshold Yr1th, the CPU makes a "No" determination at step 630, and proceeds to step 695 so as to terminate the present routine tentatively. In contrast, when the yaw rate Yr has changed from a value smaller than the first yaw rate threshold Yr1th to a value equal to or larger than the first yaw rate threshold Yr1th, the CPU makes a "Yes" determination at step 630, and proceeds to step 625 so as to set the value of the SPM control flag Xspm to "1". In this manner, when the yaw rate Yr has changed from the value smaller than the first yaw rate threshold Yr1th to the value equal to or larger than the first yaw rate threshold Yr1th in the case where the inferred curvature Cp is smaller than the curvature threshold Cpth, the CPU determines that the control start condition (first control start condition) becomes satisfied so as to set the SPM control flag Xspm to "1".

Whereas, the CPU makes a "No" determination at step 610 if the execution state of the ACC is not the execution allowable state at the time point at which the CPU proceeds to step 610, the CPU makes a "No" determination at step 610, and proceeds to step 695 so as to terminate the present routine tentatively.

Furthermore, the CPU makes a "No" determination at step 610 if the value of the SPM control flag Xspm is "1" when the CPU proceeds to step 605, the CPU makes a "No" determination at step 605, and proceeds to step 695 so as to terminate the present routine tentatively.

<SPM End Condition Satisfaction Determination>

Figure 7:
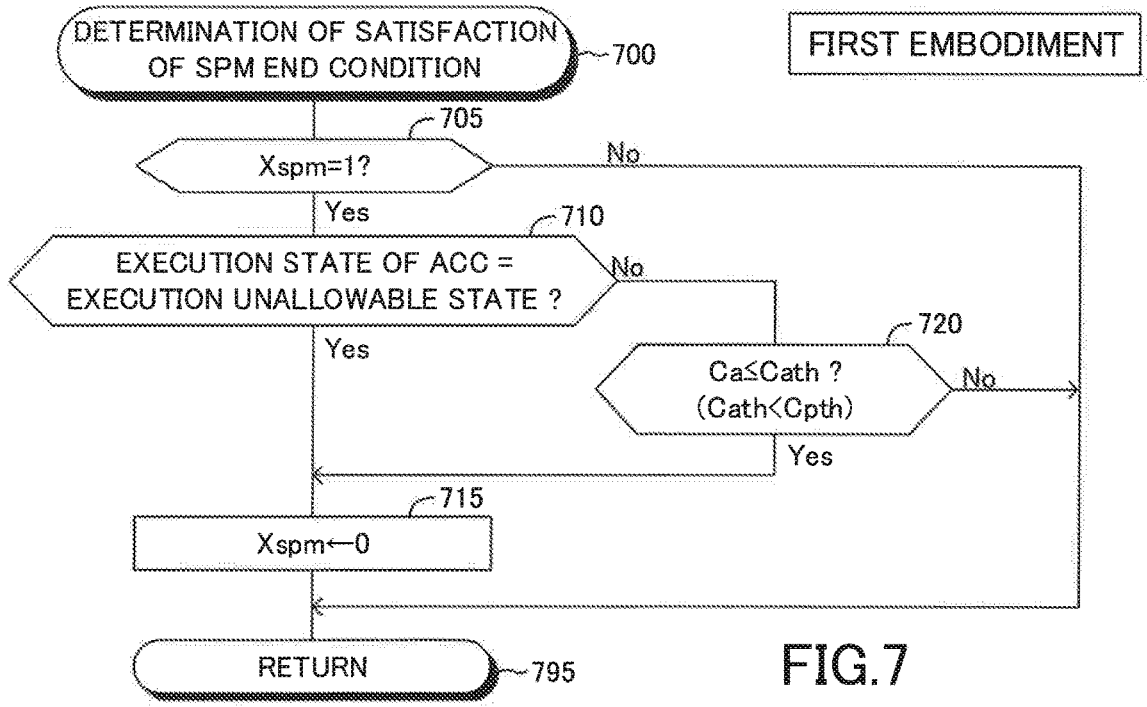
FIG. 7 is a flowchart illustrating a sub routine executed by the CPU for an SPM end condition satisfaction determination in the routine shown in FIG. 5.

When the CPU proceeds to step 535 shown in FIG. 5, the CPU starts processing from step 700 of the determination routine of a satisfaction of SPM end condition shown by a flowchart in FIG. 7, and proceeds to step 705. At step 705, the CPU determines whether or not the value of the SPM control flag Xspm is "1".

When the value of the SPM control flag Xspm is "1", the CPU makes a "Yes" determination at step 705, and proceeds to step 710. At step 710, the CPU determines whether or not the execution state of the ACC is the execution unallowable state. When the execution state of the ACC is the execution unallowable state, the CPU makes a "Yes" determination at step 710, and proceeds to step 715. At step 715, the CPU sets the value of the SPM control flag Xspm to "0", and proceeds to step 795 so as to terminate the present routine tentatively.

In contrast, when the execution state of the ACC is not the execution unallowable state, the CPU makes a "No" determination at step 710, and proceeds to step 720. At step 720, the CPU determines whether or not the actual curvature Ca is equal to or smaller than an actual curvature threshold Cath. The actual curvature threshold Cath has been set to a value (nearly zero) that is smaller than the curvature threshold Cpth.

When the actual curvature Ca is equal to or smaller than the actual curvature threshold Cath, the CPU makes a "Yes" determination at step 720, and proceeds to step 715 so as to set the value of the SPM control flag Xspm to "0". In contrast, when the actual curvature Ca is larger than the actual curvature threshold Cath, the CPU makes a "No" determination at step 720, and proceeds to step 795 so as to terminate the present routine tentatively.

Whereas, if the value of the SPM control flag Xspm is "0" at the time point at which the CPU proceeds to step 705, the CPU makes a "No" determination at step 705, and proceeds to step 795 so as to terminate the present routine tentatively.

<Calculation of Required Acceleration-Deceleration>

Figure 8:
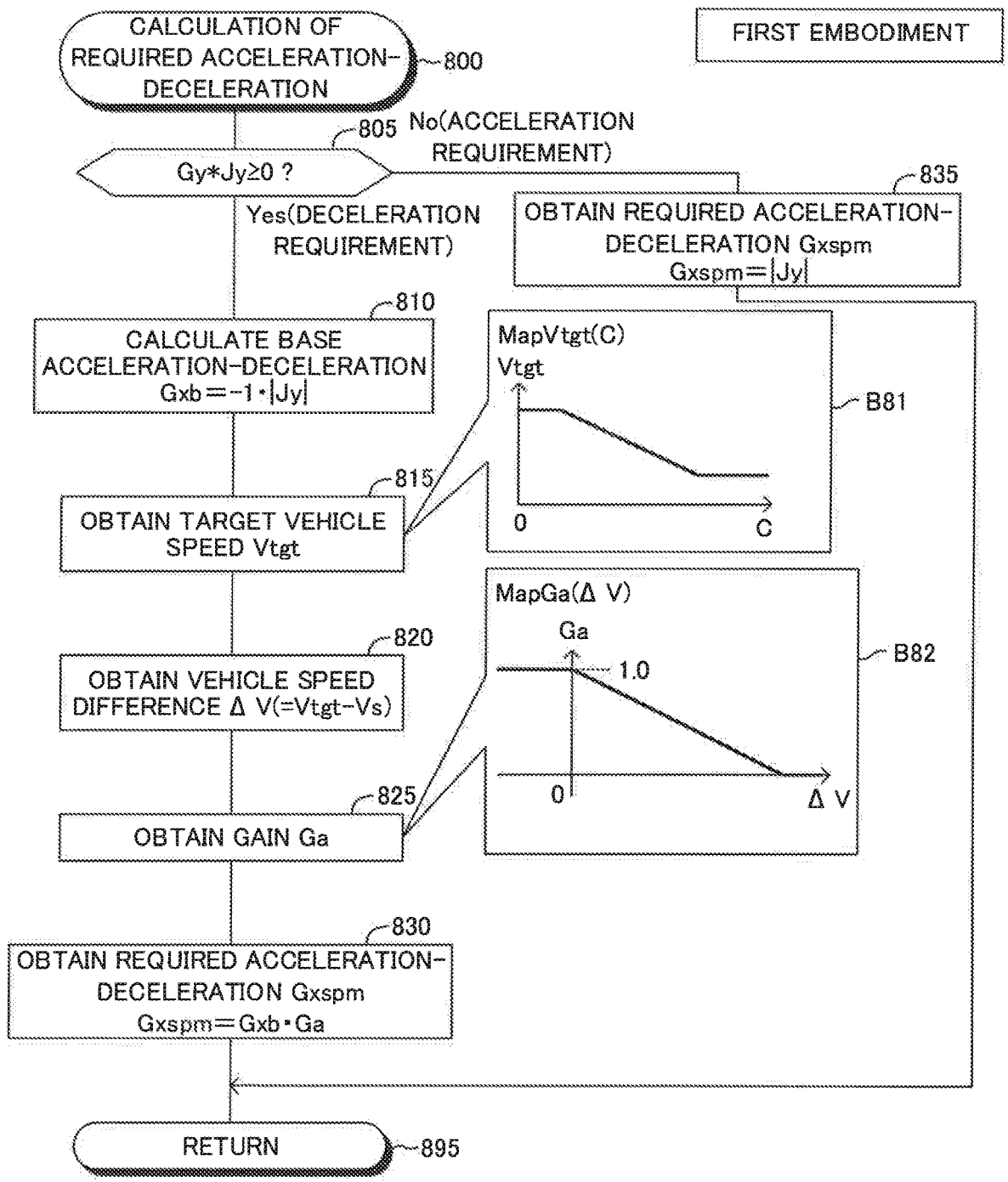
FIG. 8 is a flowchart illustrating a sub routine executed by the CPU for a calculation of required acceleration-deceleration in the routine shown in FIG. 5.

When the CPU proceeds to step 550 shown in FIG. 5, the CPU starts processing from step 800 of a calculation routine for required acceleration-deceleration shown by a flowchart in FIG. 8, and proceeds to step 805. At step 805, the CPU determines whether or not a product (Gy·Jy) of the lateral acceleration Gy and the lateral jerk Jy is equal to or larger than "0". When the product (Gy·Jy) is equal to or larger than "0", the CPU proceeds to steps from/following step 810 so as to decelerate the vehicle VA. In contrast, when the product (Gy Jy) is negative, the CPU proceeds to step 835 so as to accelerate the vehicle VA.

As shown in FIG. 3, when and after the vehicle enters the first clothoid curve section RCL 1 from the first straight road RST1, the magnitude of the lateral acceleration Gy increases from zero. At this time point, a sign of the lateral jerk Jy is the same as a sign of the lateral acceleration Gy. Therefore, a sign of the product (Gy·Jy) is positive. When and after the vehicle VA enters the steady circular section RSC from the first clothoid curve section RCL 1, the lateral acceleration Gy remains constant. At this time point, the lateral jerk Jy is zero. Therefore, the product (Gy·Jy) is zero. When and after the vehicle VA enters the second clothoid curve section RCL2 from the steady circular section RSC, the magnitude of the lateral acceleration Gy decreases. At this time point, the sign of the lateral jerk Jy is opposite to the sign of the lateral acceleration Gy. Therefore, the product (Gy·Jy) is negative.

When the product (Gy·Jy) is equal to or larger than zero, namely, when the vehicle VA is within either the first clothoid curve section RCL1 or the steady circular section RSC, the CPU makes a "Yes" determination at step 805, and executes the processes of step 810 to step 830 in this order. Thereafter, the CPU proceeds to step 895 so as to terminate the present routine tentatively.

Step 810: the CPU obtains a base acceleration-deceleration Gxb by multiplying an absolute value of the lateral jerk Jy by "−1". Typically, the base acceleration-deceleration Gxb is negative, and thus, is a deceleration. However, when the vehicle VA is within the steady circular section RSC, the base acceleration-deceleration Gxb is zero since the value of the lateral jerk Jy is zero. In this case, as described later, the required acceleration-deceleration Gxspm is zero. Consequently, the value of the required acceleration-deceleration Gxspm is zero while the vehicle VA is traveling within the steady circular section RSC.

Step 815: the CPU obtains a target vehicle speed Vtgt by applying the actual curvature Ca to a target vehicle speed map MapVtgt(C). The target vehicle speed map MapVtgt(C) is a look-up table that defines a relationship between the curvature C and the target vehicle speed Vtgt in such a manner that the target vehicle speed Vtgt becomes lower as the curvature C becomes larger (namely, as the curved road curves more sharply). The target vehicle speed map MapVtgt(C) has been stored in the ROM of the DSECU 20 in advance.

Step 820: the CPU obtains a vehicle speed difference ΔV (=Vtgt−Vs) by subtracting the current vehicle speed Vs from the target vehicle speed Vtgt.

Step 825: the CPU obtains a gain Ga by applying the vehicle speed difference ΔV to a gain map MapGa(ΔV). The gain map MapGa(ΔV) is a look-up table that defines a relationship between the vehicle speed difference ΔV and the gain Ga, and has been stored in the ROM of the DSECU 20 in advance. According to the gain map MapGa(ΔV), a value of the gain Ga is equal to "1" when the vehicle speed difference ΔV is negative (i.e., Vtgt<0). According to the gain map MapGa(ΔV), the value of the gain Ga decreases from "1" to "0" as the vehicle speed difference ΔV increases while the vehicle speed difference ΔV is positive (i.e., Vtgt>0).

Step 830: the CPU obtains the required acceleration-deceleration Gxspm by multiplying the base acceleration-deceleration Gxb by the gain Ga.

In contrast, if the product (Gy·Jy) is negative (namely, when the vehicle VA is within the second clothoid curve section RCL2) at the time point at which the CPU proceeds to step 805, the CPU makes a "No" determination at step 805, and proceeds to step 835. At step 835, the CPU obtains the absolute value of the lateral jerk Jy as the required acceleration-deceleration Gxspm. Thereafter, the CPU proceeds to step 895 so as to terminate the present routine tentatively.

As described above, in the first apparatus 10, the SPM start condition is the condition to be satisfied when the yaw rate Yr is equal to or larger than the second yaw rate threshold Yr2th in the case where the inferred curvature Cp is equal to or larger than the curvature threshold Cpth, whereas, the SPM start condition is the condition to be satisfied when the yaw rate Yr is equal to or larger than the first yaw rate threshold Yr1th that is larger than the second yaw rate threshold Yr2th in the case where the inferred curvature Cp is smaller than the curvature threshold Cpth. In other words, the first apparatus 10 changes the SPM start condition to a condition to be more easily satisfied when the inferred curvature Cp is equal to or larger than the curvature threshold Cpth than when the inferred curvature Cp is smaller than the curvature threshold Cpth. Therefore, the first apparatus 10 can decrease the possibility that the SPM start condition is incorrectly determined to become satisfied when the vehicle VA is not travelling on the curved road RCU, and can let the SPM start condition become satisfied at the appropriately early timing when the vehicle VA is travelling on the curved road RCU.

(Modification of First Embodiment)

The DSECU 20 according to this modification of the first embodiment executes a lane tracing assist control (referred to as an "LTA"). The lane tracing assist control is a control (steering control) to obtain by calculation (calculates) a target steering/steered angle θLTA for making a position of the vehicle VA in the lane width direction coincide with a "target traveling line Ltgt that is set in the host lane", and drive the steering motor 66 to vary a steered angle so as to let the steering/steered angle θ coincide with the target steering/steered angle θLTA. The target traveling line Ltgt is, for example, the imaginary line passing through the center of the pair of the right and left lane markers defining the host lane in the road width direction.

For instance, the DSECU 20 obtains the target steering angle θLTA according to an equation (4) below.

$$\theta LTA = K1 \cdot Cb + K2 \cdot \theta L + K3 \cdot dL \quad (4)$$

In the equation (4), Cb is an actual curvature of the target traveling line Ltgt (i.e. a curvature of the target traveling line Ltgt at the current position of the vehicle VA). A sign (+ or −) of the curvature Cb observed when the target traveling line Ltgt is a left curve is opposite to a sign of the curvature Cb observed when the target traveling line Ltgt is a right curve.

θL is a deviation angle (difference in angle) between a direction of the target traveling line Ltgt and a moving direction of the vehicle VA.

dL is a distance in the lane width direction between the target traveling line Ltgt and a center position of a front end of the vehicle VA in the vehicle width direction.

The values (Cb, θL, dL) may be obtained by the camera device 23, or may be obtained by the DSECU 20 based on the camera image obtained by the camera device 23.

K1, K2, and K3 are gains (constants).

It should be noted that the lane tracing assist control is well-known (refer to, for example, Japanese Patent Application Laid-Open (kokai) No. 2008-195402, Japanese Patent Application Laid-Open (kokai) No. 2009-190464, Japanese Patent Application Laid-Open (kokai) No. 2010-6279, and Japanese issued U.S. Pat. No. 4,349,210).

Meanwhile, as understood from the equation (4) described above for calculating the target steering angle θLTA, the target steering angle θLTA is a value varying depending on an actual curvature Cb of the road on which the vehicle VA is traveling at the present position. Therefore, an absolute value |θLTA| of the target steering angle θLTA tends to increase when and after the vehicle enters the first clothoid curve section RCL1 from the first straight road RST1. In other words, when the absolute value |θLTA| is large, it is likely or it can be considered that the vehicle VA has already been entering the curved road RCU.

In view of the above, in the present modification, in the case where the inferred curvature Cp is equal to or larger than the curvature threshold Cpth, the SPM start condition used when the magnitude (absolute value |θLTA|) of the target steering angle θLTA is equal to or larger than a threshold angle θth has been set to a condition that is more easily satisfied (by the yaw rate Yr) than (or compared to) the SPM start condition used when the magnitude of the target steering angle θLTA is smaller than the threshold angle θth.

Figure 9:
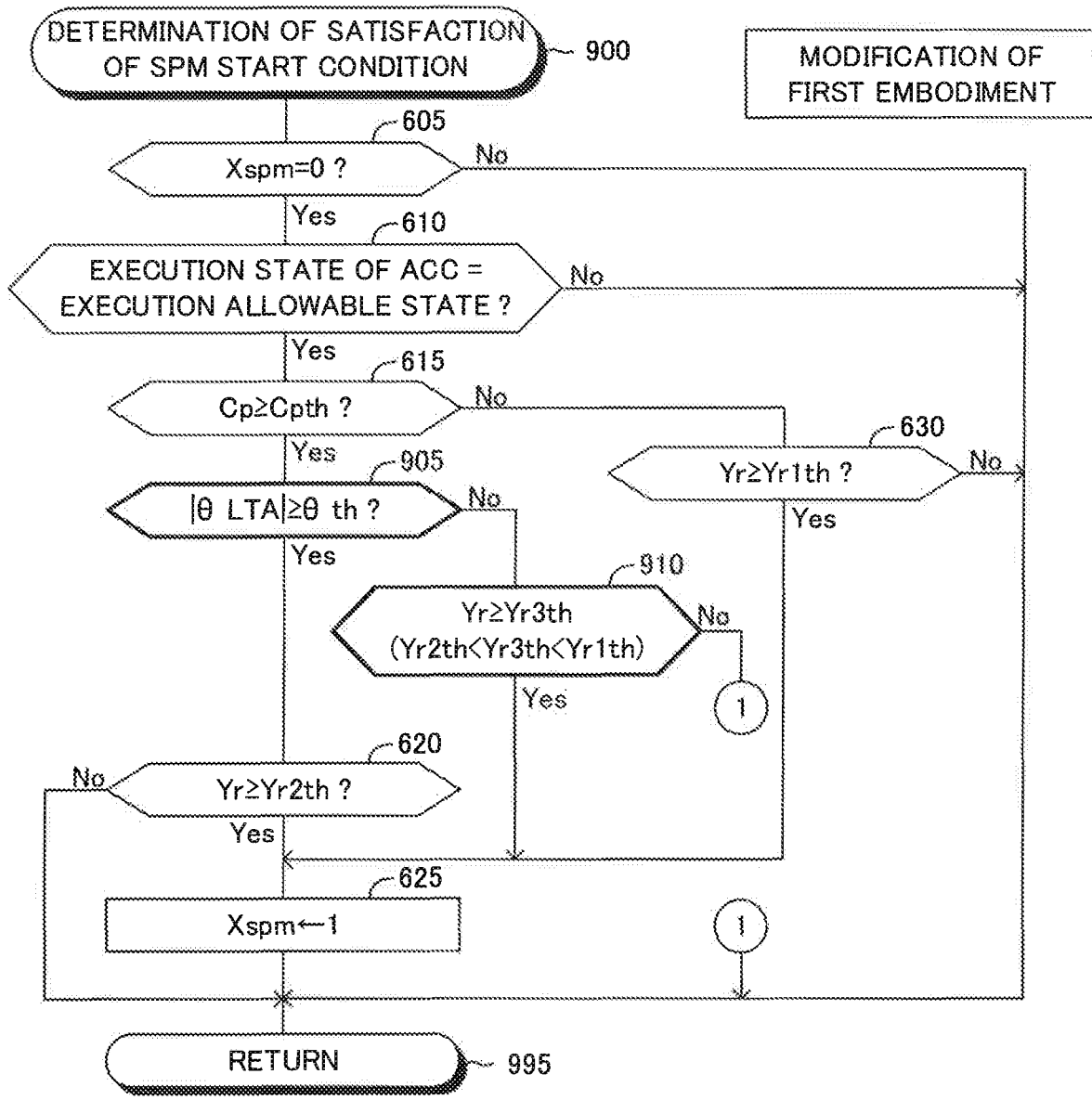
FIG. 9 is a flowchart illustrating a sub routine executed by a CPU according to a modification of the first embodiment, for an SPM start condition satisfaction determination.

The CPU of the present modification is different from the CPU of the first apparatus 10 of the above described embodiment only in that it executes a determination routine of a satisfaction of SPM start condition shown in FIG. 9 in place of the routine shown in FIG. 6. It should be noted that each of the steps shown in FIG. 9 that lets the CPU execute the same process as the corresponding step shown in FIG. 6 is given the same reference as one given to that step shown in FIG. 6, and description thereof may be omitted.

When the CPU proceeds to step 530 shown in FIG. 5, the CPU starts processing from step 900 of a sub routine shown by a flowchart in FIG. 9. When the CPU makes a "Yes" determination at each of "steps 605, 610, and 615" shown in FIG. 9, the CPU proceeds to step 905. At step 905, the CPU determines whether or not the magnitude (absolute value |θLTA|) of the target steering angle θLTA is equal to or larger than the threshold angle θth.

When the magnitude (|θLTA|) of the target steering angle θLTA is equal to or larger than the threshold angle θth, the CPU makes a "Yes" determination at step 905, and proceeds to step 620 shown in FIG. 9 so as to determine whether or not the yaw rate Yr is equal to or larger than the above described second yaw rate threshold Yr2th. In contrast, when the magnitude (|θLTA|) of the target steering angle θLTA is smaller than the threshold angle θth, the CPU makes a "No" determination at step 905, and proceeds to step 910.

At step 910, the CPU determines whether or not the yaw rate Yr is equal to or larger than a third yaw rate threshold Yr3th. The third yaw rate threshold Yr3th has been set at a value that is larger than the second yaw rate threshold Yr2th and is smaller than the first yaw rate threshold Yr1th. The third yaw rate threshold Yr3th may be referred to as a "third value".

When the yaw rate Yr is smaller than the third yaw rate threshold Yr3th, it can be determined that the SPM start condition has not become satisfied. In this case, the CPU makes a "No" determination at step 910, and proceeds to step 995 so as to terminate the present routine tentatively. Whereas, when the yaw rate Yr is equal to or larger than the third yaw rate threshold Yr3th, it can be determined that the SPM start condition has become satisfied. In this case, the CPU makes a "Yes" determination at step 910, and proceeds to step 625 shown in FIG. 9.

In this manner, in the case where the inferred curvature Cp is equal to or larger than the curvature threshold Cpth and the magnitude (|θLTA|) of the target steering angle θLTA is equal to or larger than the threshold angle 9th, it is determined that the control start condition (second control start condition) becomes satisfied and the value of the SPM control flag Xspm is set to "1", when the yaw rate Yr has changed from a value smaller than the second yaw rate threshold Yr2th to a value equal to or larger than the second yaw rate threshold Yr2th.

In addition, in the case where the inferred curvature Cp is equal to or larger than the curvature threshold Cpth and the magnitude (|θLTA) of the target steering angle θLTA is smaller than the threshold angle θth, it is determined that the control start condition (second control start condition) becomes satisfied and the value of the SPM control flag Xspm is set to "1", when the yaw rate Yr has changed from a value smaller than the third yaw rate threshold Yr3th to a value equal to or larger than the third yaw rate threshold Yr3th.

Thus configured modification can decrease the possibility that the SPM start condition is determined to become incorrectly satisfied when the vehicle VA is not travelling on the curved road RCU, and can let the SPM start condition become satisfied at the appropriately early timing when the vehicle VA is travelling on the curved road RCU.

Second Embodiment

A vehicle control apparatus (hereinafter, referred to as a "second apparatus") 10 according to a second embodiment of the present disclosure will be described with reference to FIGS. 10 to 13.

The second apparatus 10 obtains by calculation (calculates), as the required acceleration-deceleration Gxspm, a first required acceleration-deceleration Gxspm1 when a first SPM start condition (first control start condition) becomes satisfied. The first SPM start condition becomes satisfied when the yaw rate Yr becomes equal to or larger than the first yaw rate threshold Yr1th.

The second apparatus 10 obtains by calculation (calculates), as the required acceleration-deceleration Gxspm, a second required acceleration-deceleration Gxspm2 when a second SPM start condition becomes satisfied. The second SPM start condition becomes satisfied when the yaw rate Yr becomes equal to or larger than the second yaw rate threshold Yr2th that is smaller than the first yaw rate threshold Yr1th wile (in the case where) the inferred curvature Cp is equal to or larger than the curvature threshold Cpth.

Furthermore, the second apparatus 10 obtains by calculation (calculates) the first required acceleration-deceleration Gxspm1 and the second required acceleration-deceleration Gxspm2 in such a manner that a magnitude of the second required acceleration-deceleration Gxspm2 is smaller than a magnitude of the first required acceleration-deceleration Gxspm1.

Figure 10:
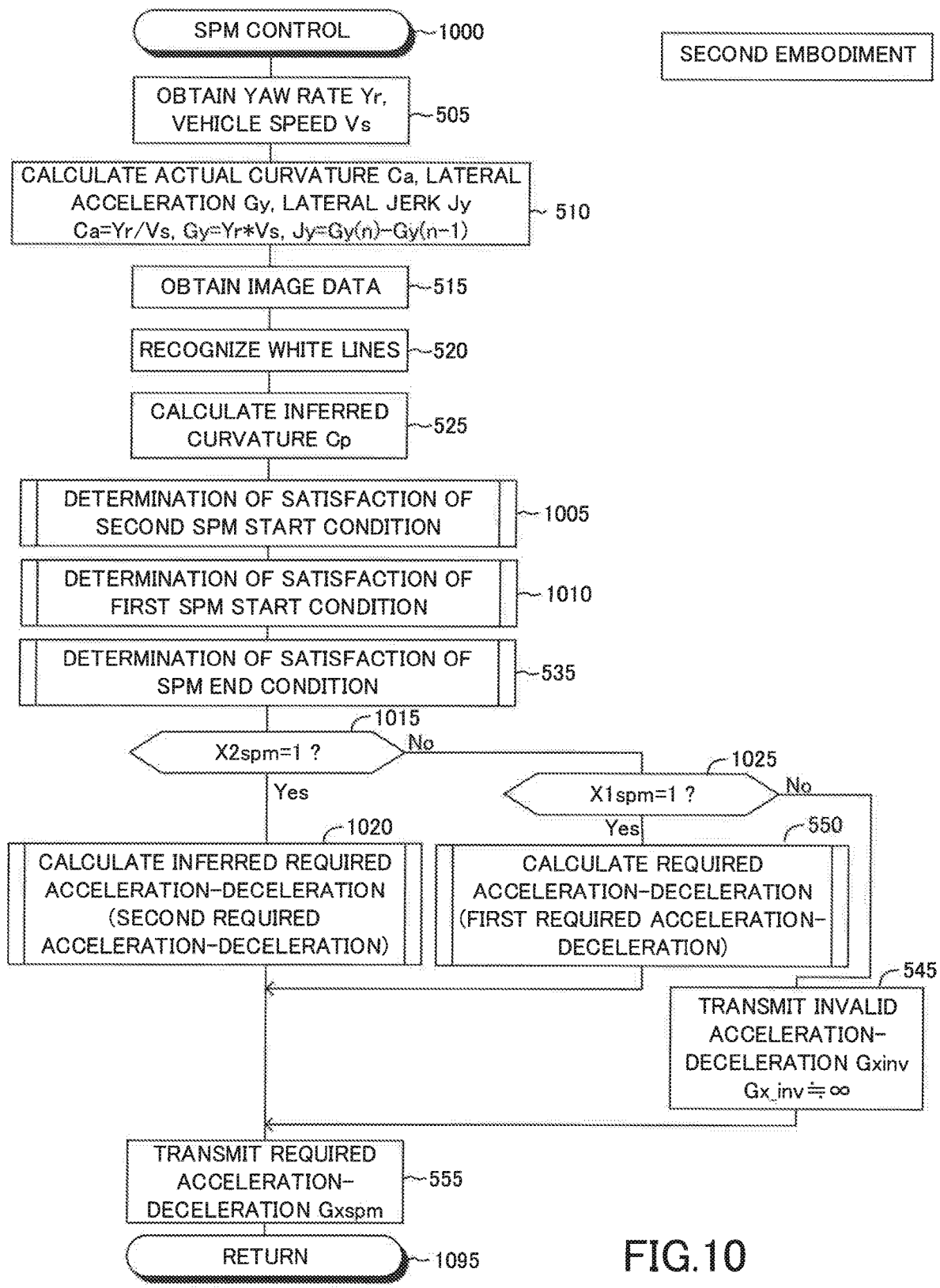
FIG. 10 is a flowchart executed by a CPU of a driving support ECU according to a second embodiment of the present disclosure.
Figure 11:
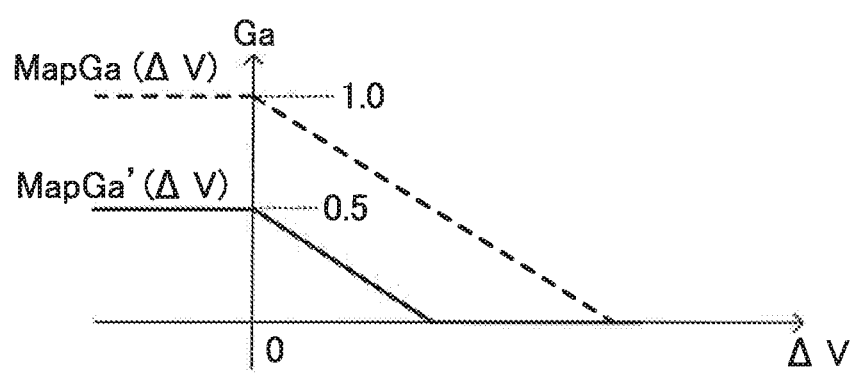
FIG. 11 is a drawing for describing a gain map of the second embodiment.

The CPU of the DSECU 20 of the second apparatus 10 executes a routine shown by a flowchart in FIG. 10 in place of the routine shown in FIG. 5. It should be noted each of the steps shown in FIG. 10 that lets the CPU execute the same process as the corresponding step shown in FIG. 5 is given the same reference as one given to that step shown in FIG. 5, and description thereof may be omitted.

Hereinafter, a first SPM control flag X1spm may simply be referred to as a flag X1spm and a second SPM control flag X2spm may simply be referred to as a flag X2spm.

When an appropriate time point comes, the CPU starts processing from step 1000 shown in FIG. 10, and executes the processes of step 505 to step 525, and then, processes of step 1005 and step 1010. At step 1005, the CPU executes a "determination routine of a satisfaction of second SPM start condition" described later. At step 1010, the CPU executes a "determination routine of a satisfaction of first SPM start condition" described later. Thereafter, the CPU executes the process of step 535, and proceeds to step 1015.

At step 1015, the CPU determines whether or not a value of the flag X2spm is "1". The value of the flag X2spm is set to "1" when the second SPM start condition becomes satisfied (refer to step 1210 described later), and is set to "0" when the first SPM start condition becomes satisfied (refer to step 1310 described later). Furthermore, the value of the flag X2spm is set to "0" through the above described initialization routine, and is also set to "0" when the SPM end condition becomes satisfied.

When the value of the flag X2spm is "1", the CPU makes a "Yes" determination at step 1015, and proceeds to step 1020. At step 1020, the CPU executes an inferred required acceleration-deceleration calculation routine so as to obtain by calculation the second required acceleration-deceleration Gxspm2.

The inferred required acceleration-deceleration calculation routine is almost the same as the required acceleration-deceleration calculation routine shown by the flowchart in FIG. 8, except the following points. Namely, when the CPU proceeds to step 825 in the inferred required acceleration-deceleration calculation routine, the CPU obtains a gain Ga' by applying the vehicle speed difference ΔV to a gain map MapGa'(ΔV) that is shown by a solid line in FIG. 11. The gain Ga' obtained using the gain map MapGa'(ΔV) is a half of the gain Ga obtained using the gain map MapGa(ΔV) shown in FIG. 8 (the gain map MapGa(ΔV) is shown by a broken line in FIG. 11). Thus, if the vehicle speed difference ΔV is a certain value, the gain Ga' used in the inferred required acceleration-deceleration calculation routine is smaller than the gain Ga. Accordingly, if the lateral jerk Jy and the vehicle speed difference ΔV are respective certain values, a magnitude of the second required acceleration-deceleration Gxspm1 is smaller than a magnitude of the first required acceleration-deceleration Gxspm1.

Thereafter, at step 555 shown in FIG. 10, the CPU transmits the required acceleration-deceleration Gxspm, and proceeds to step 1095 so as to terminate the present routine tentatively.

In contrast, when the value of the flag X2spm is "0" at the time point at which the CPU proceeds to step 1015, the CPU makes a "No" determination at step 1015, and proceeds to step 1025. At step 1025, the CPU determines whether or not the value of the flag X1spm is "1". The value of the flag X1spm is set to "1" when the first SPM start condition becomes satisfied (refer to step 1310 described later), and is set to "0" when the SPM end condition becomes satisfied. Furthermore, the value of the flag X1spm is set to "0" through the above described initialization routine.

When the value of the flag X1spm is "1", the CPU makes a "Yes" determination at step 1025, and proceeds to step 550 shown in FIG. 10. At step 550, the CPU executes the required acceleration-deceleration calculation routine shown in FIG. 8 so as to obtain by calculation the required acceleration-deceleration Gxspm as the first required acceleration-deceleration Gxspm1. In this case, the gain map MapGa(ΔV) shown in a block B82 in FIG. 8 is used. Thereafter, the CPU proceeds to step 555 shown in FIG. 10.

In contrast, when the value of the flag X1spm is "0", the CPU makes a "No" determination at step 1025, and proceeds to step 545 shown in FIG. 10.

<Second SPM Start Condition Satisfaction Determination>

Figure 12:
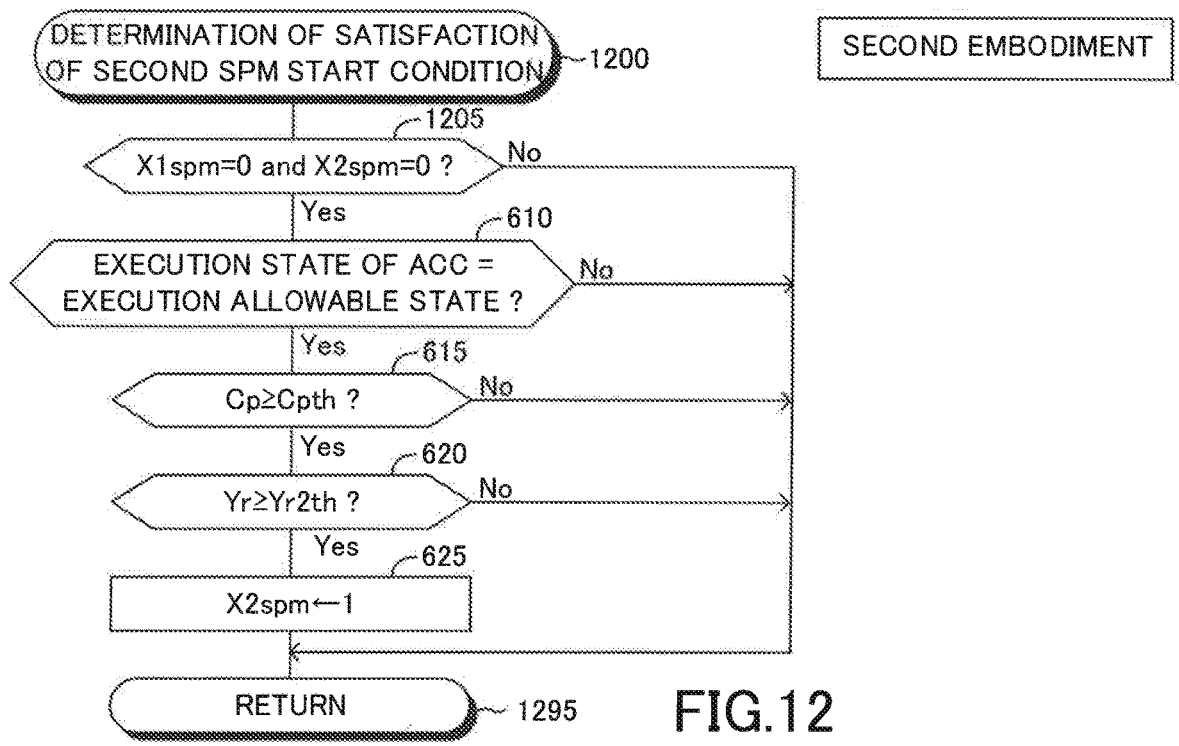
FIG. 12 is a flowchart illustrating a sub routine executed by the CPU for a second SPM start condition satisfaction determination in the routine shown in FIG. 10.

When the CPU proceeds to step 1005 shown in FIG. 10, the CPU starts processing from step 1200 of the second SPM start condition satisfaction determination routine shown by a flowchart in FIG. 12, and proceeds to step 1205. It should be noted each of the steps shown in FIG. 12 that lets the CPU execute the same process as the corresponding step shown in FIG. 6 is given the same reference as one given to that step shown in FIG. 6, and description thereof may be omitted.

At step 1205, the CPU determines whether or not both of the value of the flag X1spm and the value of the flag X2spm are "0". When both of the value of the flag X1spm and the value of the flag X2spm are "0", the CPU makes a "Yes" determination at step 1205, and proceeds to step 610 shown in FIG. 12. When the CPU makes a "Yes" determination at step 610 shown in FIG. 12, the CPU proceeds to step 615 shown in FIG. 12. When the CPU makes a "No" determination at step 615 shown in FIG. 12, unlike the routine shown in FIG. 6, the CPU directly proceeds to step 1295 so as to terminate the present routine tentatively without proceeding to step 630.

When the CPU makes a "Yes" determination at step 615 shown in FIG. 12, the CPU proceeds to step 620 shown in FIG. 12. When the CPU makes a "Yes" determination at step 620 shown in FIG. 12, the CPU proceeds to step 1210 so as to set the value of the flag X2spm to "1". Thereafter, the CPU proceeds to step 1295 so as to terminate the present routine tentatively.

Whereas, when at least one of the value of the flag X1spm and the value of the flag X2spm is "1" at the time point at which the CPU proceeds to step 1205, the CPU makes a "No" determination at step 1205, and proceeds to step 1295 so as to terminate the present routine tentatively. Furthermore, when the CPU makes a "No" determination at either step 610 or step 620, the CPU proceeds to step 1295 so as to terminate the present routine tentatively.

<First SPM Start Condition Satisfaction Determination>

Figure 13:
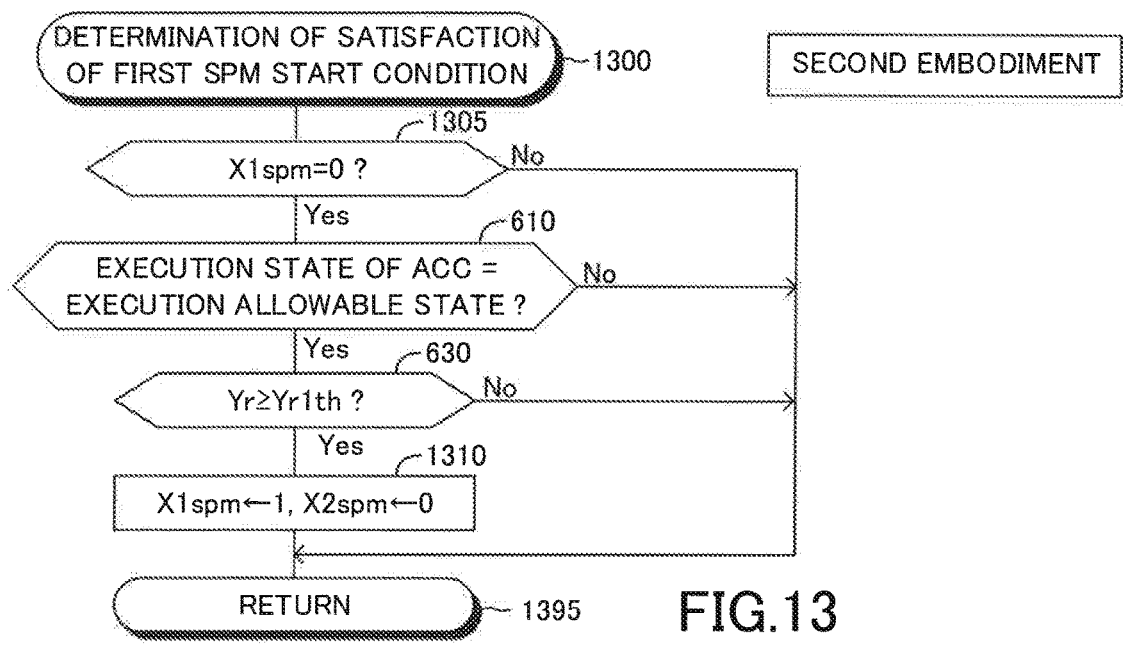
FIG. 13 is a flowchart illustrating a sub routine executed by the CPU for a first SPM start condition satisfaction determination in the routine shown in FIG. 10.

When the CPU proceeds to step 1010 shown in FIG. 10, the CPU starts processing from step 1300 of the first SPM start condition satisfaction determination routine shown by a flowchart in FIG. 13, and proceeds to step 1305. It should be noted each of the steps shown in FIG. 13 that lets the CPU execute the same process as the corresponding step shown in FIG. 6 is given the same reference as one given to that step shown in FIG. 6, and description thereof may be omitted.

At step 1305, the CPU determines whether or not the value of the flag X1spm is "0". When the value of the flag X1spm is "0", the CPU makes a "Yes" determination at step 1305 so as to proceed to step 610 shown in FIG. 13. When the CPU makes a "Yes" determination at step 610 shown in FIG. 13, the CPU proceeds to step 630 shown in FIG. 13.

When the CPU makes a "Yes" determination at step 630 shown in FIG. 13, the CPU proceeds to step 1310 so as to set the value of the flag X1spm to "1" and set the value of the flag X2spm to "0". Thereafter, the CPU proceeds to step 1395 so as to terminate the present routine tentatively.

It should be noted that the CPU directly proceeds to step 1395 so as to terminate the present routine tentatively, when the CPU makes a "No" determination at one of the step 610 shown in FIG. 13 and step 630 shown in FIG. 13.

As described above, the thus configured second apparatus 10 obtains by calculation (calculates) the first required acceleration-deceleration Gxspm1 and the second required acceleration-deceleration Gxspm2 in such a manner that the magnitude of the second required acceleration-deceleration Gxspm2 is smaller than the magnitude of the first required acceleration-deceleration Gxspm1. Accordingly, even if it is incorrectly determined that the second SPM start condition has become satisfied while the vehicle is traveling on the straight road, the magnitude of the required acceleration-deceleration Gxspm (i.e., the magnitude of the second required acceleration-deceleration Gxspm2) is relatively small, and thus, strange feeling that the driver may have can be suppressed.

(Modification of Second Embodiment)

The modification of the second embodiment will next be described with reference to FIG. 14. As described above, the magnitude of the second required acceleration-deceleration Gxspm2 is smaller than the magnitude of the first required acceleration-deceleration Gxspm1. Thus, when the yaw rate Yr becomes larger than the relatively large first yaw rate threshold Yr1th so that the first SPM start condition becomes satisfied after the yaw rate Yr became larger than the relatively small second yaw rate threshold Yr2th so that the second SPM start condition became satisfied in the case where the inferred curvature Cp has been equal to or larger than the curvature threshold Cpth, the required acceleration-deceleration Gxspm rapidly changes from the second required acceleration-deceleration Gxspm2 to the first required acceleration-deceleration Gxspm1. In other words, a change amount in the required acceleration-deceleration Gxspm per unit time becomes large in the above case. In view of the above, when the first SPM start condition becomes satisfied after the second SPM start condition became satisfied, the CPU of the present modification imposes a limitation on the required acceleration-deceleration Gxspm in such a manner that a magnitude of the change amount in the required acceleration-deceleration Gxspm per unit time does not become larger than a threshold (guard value) Gth. This can decrease a possibility of providing a feeling of strangeness to the driver, immediately after the first SPM start condition becomes satisfied.

When the CPU of the present modification makes a "Yes" determination at step 630 shown in FIG. 13, the CPU sets a value of a timer T to "0" if the value of the flag Xspm2 is "1" through unillustrated steps, and then, proceeds to step 1310 shown in FIG. 13. In contrast, when the CPU of the present modification makes a "Yes" determination at step 630 shown in FIG. 13, the CPU sets the value of the timer T to a "predetermined value that is larger than a timer threshold Tth described later" if the value of the flag Xspm2 is "0" through unillustrated steps, and then, proceeds to step 1310 shown in FIG. 13.

Figure 14:
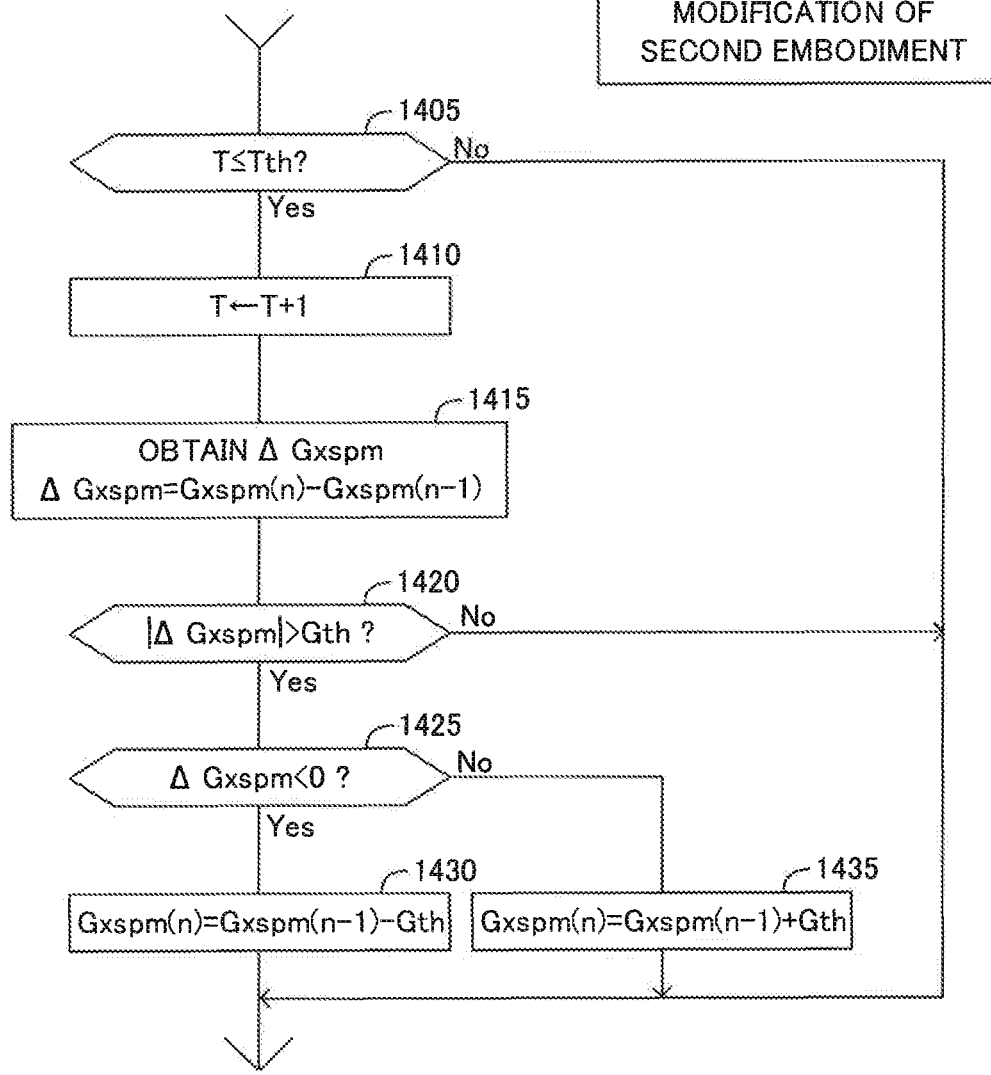
FIG. 14 is a flowchart illustrating a routine executed by a CPU according to a modification of the second embodiment.

After the CPU of the present modification executes the process of step 550 shown in FIG. 10, the CPU proceeds to step 1405 shown in FIG. 14. The CPU determines whether or not the value of the timer T is equal to or smaller than the timer threshold Tth. When the value of the timer T is equal to or smaller than the timer threshold Tth, the CPU makes a "Yes" determination at step 1405, and executes processes of step 1410 and step 1415 in this order so as to proceed to step 1420.

Step 1410, the CPU adds "1" to the value of the timer T.

Step 1415, the CPU obtains by calculation an acceleration-deceleration difference ΔGxspm that is the change amount in the required acceleration-deceleration Gxspm per unit time, by subtracting a previous required acceleration-deceleration Gxspm (n−1) from a current required acceleration-deceleration Gxspm (n). The current required acceleration-deceleration Gxspm (n) is the required acceleration-deceleration Gxspm that has been obtained at step 550 shown in FIG. 10 currently. The previous required acceleration-deceleration Gxspm (n−1) is the required acceleration-deceleration Gxspm that was obtained previously (a predetermined time before) at "either step 1020 or step 550" shown in FIG. 10.

Step 1420, the CPU determines whether or not a magnitude of the acceleration-deceleration difference ΔGxspm is larger than the threshold Gth that is a positive value.

When the magnitude of the acceleration-deceleration difference ΔGxspm is larger than the threshold Gth, the CPU makes a "Yes" determination at step 1420 so as to proceed to step 1425. At step 1425, the CPU determines whether or not the acceleration-deceleration difference ΔGxspm is smaller than zero. When the acceleration-deceleration difference ΔGxspm is smaller than zero (i.e., when the current required acceleration-deceleration Gxspm (n) is smaller than the previous required acceleration-deceleration Gxspm (n−1)), the CPU makes a "Yes" determination at step 1425, and proceeds to step 1430.

At step 1430, the CPU employs, as the current required acceleration-deceleration Gxspm (n), a subtracted value obtained by subtracting the threshold Gth from the previous required acceleration-deceleration Gxspm (n−1). Thereafter, the CPU proceeds to step 555 shown in FIG. 10. Those processes can prevent (the magnitude of) the change amount in the required acceleration-deceleration Gxspm from being larger than the threshold Gth.

Whereas, if the acceleration-deceleration difference ΔGxspm is larger than zero, the CPU makes a "No" determination at step 1425 so as to proceed to step 1435. At step 1435, the CPU employs, as the current required acceleration-deceleration Gxspm (n), an added value obtained by adding the threshold Gth to the previous required acceleration-deceleration Gxspm (n−1). Thereafter, the CPU proceeds to step 555 shown in FIG. 10. Those processes also can prevent (the magnitude of) the change amount in the required acceleration-deceleration Gxspm from being larger than the threshold Gth.

It should be noted that, if the value of the timer T is larger than the timer threshold Tth, the CPU makes a "No" determination at step 1405 so as to directly proceed to step 555 shown in FIG. 10. Furthermore, if the magnitude of the acceleration-deceleration difference ΔGxspm is equal to or smaller than the threshold Gth, the CPU makes a "No" determination at step 1420 so as to directly proceed to step 555 shown in FIG. 10.

As described above, in a period from a first specific time point (start time point) described below to a second specific time point (end time point) described below (i.e., the period in which the value of the timer T is equal to or larger than zero, and equal to or smaller than the timer threshold Tth) after the first SPM start condition has become satisfied after the second SPM start condition became satisfied, the required acceleration-deceleration Gxspm is calculated (obtained) in such a manner that the magnitude of the change amount in the required acceleration-deceleration Gxspm per unit time does not exceed the threshold Gth. The first specific time point is the time point at which the first SPM start condition becomes satisfied. The second specific time point is the time point at which a predetermined time elapses from the first SPM start condition becomes satisfied. This can decrease a possibility of providing a feeling of strangeness to the driver, the feeling of strangeness being caused by a rapid change in the acceleration-deceleration Gx acting on the vehicle VA.

The present disclosure should not be limited to the above embodiments, and may employ various modifications within the scope of the present disclosure.

For instance, the CPU may be configured to operate as follows when the inferred curvature Cp is equal to or larger than the curvature threshold Cpth.

The CPU converts/changes the actual yaw rate Yr detected by the yaw rate sensor 22 into a yaw rate value YrL that is larger than but corresponds to the actual yaw rate Yr. For example, the yaw rate value YrL may be obtained by multiplying the actual yaw rate Yr by a coefficient larger than 1. Thereafter, the CPU determines whether or not the converted yaw rate value YrL is equal to or larger than a predetermined yaw rate threshold Yrth in order to determine whether or not the second SPM start condition becomes satisfied. In this configuration, when the inferred curvature Cp is smaller than the curvature threshold Cpth, the CPU does not perform the above described conversion on the actual yaw rate Yr detected by the yaw rate sensor 22, and determines whether or not the actual yaw rate Yr detected by the yaw rate sensor 22 is equal to or larger than the yaw rate threshold Yrth in order to determine whether or not the first SPM start condition becomes satisfied. This modification can also make/let the SPM start condition used when the inferred curvature Cp is equal to or larger than the curvature threshold Cpth be a condition that is more easily satisfied than when the inferred curvature Cp is smaller than the curvature threshold Cpth.

Furthermore, the CPU may be configured to determine whether or not the SPM start condition becomes satisfied using a magnitude of the lateral acceleration Gy in place of the yaw rate Yr. In other words, a physical parameters, such as the yaw rate Yr and the lateral acceleration Gy, used for determining whether or not the SPM start condition becomes satisfied may be physical quantities (referred to as "turning movement physical quantities) each of which acts on the vehicle VA due to turning movement of the vehicle VA (i.e., any one of the physical quantities that varies in response to the turning movement of the vehicle VA).

In addition, the CPU may obtain a current position of the vehicle VA based on signals obtained by the GPS receiver 28, and obtains, as the inferred curvature Cp, the curvature C at the preview position Pp using the map data 29 and the thus obtained current position.

The vehicle control apparatuses described above may be applied to an electric car and to a hybrid vehicle, as well. Furthermore, the way of calculating the required acceleration-deceleration Gxspm should not be limited to the ways described above.

What is claimed is:

1. A vehicle control apparatus comprising:
a sensor configured to detect a turning movement physical quantity that varies depending on a state of a turning movement of a vehicle when said vehicle is turning;
an acceleration-deceleration device configured to vary an acceleration-deceleration of said vehicle;
a control unit configured to perform an acceleration-deceleration control to:
determine whether or not said vehicle is traveling on a curved road by determining whether or not said turning movement physical quantity satisfies a predetermined control start condition;
calculate, when it is determined that said vehicle is traveling on a curved road, a required acceleration-deceleration to let said vehicle run at a target speed depending on a curvature of said curved road, and control said acceleration-deceleration device so as to make an actual acceleration-deceleration of said vehicle become equal to said calculated required acceleration-deceleration; and
a shape obtaining device configured to obtain road shape information representing a shape of a road at a position that is away from said vehicle by a predetermined distance along a moving direction of said vehicle,
wherein,
said control unit is configured to:
determine whether or not a curved road is present in said moving direction of said vehicle based on said road shape information;
determine that a first control start condition as said predetermined control start condition becomes satisfied when said magnitude of said turning movement physical quantity has changed from a value smaller than a first value to a value equal to or larger than said first value, in a case where it has been determined that said curved road is not present based on the road shape information that has been obtained by the shape obtaining device; and
determine that a second control start condition as said predetermined control start condition becomes satisfied when a magnitude of said turning movement physical quantity has changed from a value smaller than a second value smaller than said first value to a value equal to or larger than said second value, in a case where it has been determined that said curved road is present based on the road shape information that has been obtained by the shape obtaining device;
wherein,
said control unit is configured to:
start a first acceleration-deceleration control as said acceleration-deceleration control, when it is determined that said first control start condition becomes satisfied;
start a second acceleration-deceleration control as said acceleration-deceleration control, when it is determined that said second control start condition becomes satisfied; and
calculate said required acceleration-deceleration in such a manner that a magnitude of said required acceleration-deceleration for said second acceleration-deceleration control is smaller than a magnitude of said required acceleration-deceleration for said first acceleration-deceleration control.

2. The vehicle control apparatus according to claim 1, wherein,
said control unit is configured to calculate, when it is determined that said first control start condition becomes satisfied while executing said second acceleration-deceleration control so as to start said first acceleration-deceleration control, said required acceleration-deceleration in such a manner that a magnitude of a change amount in said required acceleration-deceleration per unit time does not exceed a predetermined guard threshold in a period from a start time point at which said first acceleration-deceleration control is started to an end time point at which a predetermined time elapses from said start time point.

3. A vehicle control apparatus comprising:
a sensor configured to detect a turning movement physical quantity that varies depending on a state of a turning movement of a vehicle when said vehicle is turning;
an acceleration-deceleration device configured to vary an acceleration-deceleration of said vehicle;
a control unit configured to perform an acceleration-deceleration control to:
determine whether or not said vehicle is traveling on a curved road by determining whether or not said turning movement physical quantity satisfies a predetermined control start condition;
calculate, when it is determined that said vehicle is traveling on a curved road, a required acceleration-deceleration to let said vehicle run at a target speed depending on a curvature of said curved road, and control said acceleration-deceleration device so as to make an actual acceleration-deceleration of said vehicle become equal to said calculated required acceleration-deceleration; and
a shape obtaining device configured to obtain road shape information representing a shape of a road at a position that is away from said vehicle by a predetermined distance along a moving direction of said vehicle,
wherein,
said control unit is configured to:
determine whether or not a curved road is present in said moving direction of said vehicle based on said road shape information;
determine that a first control start condition as said predetermined control start condition becomes satisfied when said magnitude of said turning movement physical quantity has changed from a value smaller than a first value to a value equal to or larger than said first value, in a case where it has been determined that said curved road is not present based on the road shape information that has been obtained by the shape obtaining device; and
determine that a second control start condition as said predetermined control start condition becomes satisfied when a magnitude of said turning movement physical quantity has changed from a value smaller than a second value smaller than said first value to a value equal to or larger than said second value, in a case where it has been determined that said curved road is present based on the road shape information that has been obtained by the shape obtaining device;
the vehicle control apparatus further comprising a steered angle changing device configured to change a steered angle of said vehicle,
wherein, said control unit is configured to:
- perform a steering angle control to calculate a target steered angle for letting said vehicle travel along a lane, and to control said steered angle changing device so as to make an actual steered angle of said vehicle equal to said target steered angle;
- determine whether or not a magnitude of said target steered angle is equal to or larger than a predetermined threshold angle, when it is determined that said curved road is present based on said road shape information;
- start said acceleration-deceleration control when said second control start condition becomes satisfied while said magnitude of said target steered angle is equal to or larger than said predetermined threshold angle; and
- determine that a third control start condition as said predetermined control start condition becomes satisfied, when a magnitude of said turning movement physical quantity has changed from a value smaller than a third value to a value equal to or larger than said third value while said magnitude of said target steered angle is smaller than said predetermined threshold angle, said third value being smaller than said first value and larger than said second value.

* * * * *